United States Patent

Buternowsky et al.

[11] Patent Number: 5,809,090
[45] Date of Patent: Sep. 15, 1998

[54] DIGITAL DIVERSITY RECEIVER SYSTEM

[75] Inventors: Barry D. Buternowsky, Burnaby, Canada; Edward J. Anthony, Quincy, Ill.; Mihaela C. Beluri, North Vancouver; Xavier Carbo Figueras, Burnaby, both of Canada; Robert Addison Langridge, Jr., Quincy, Ill.; Robert Richard Leyendecker, Blaine, Wash.; Glaudio Gustavo Rey, Coquitlam; Desmond Wai Ming Yan, Vancouver, both of Canada

[73] Assignee: Glenayre Electronics, Inc., Charlotte, N.C.

[21] Appl. No.: 611,461

[22] Filed: Mar. 4, 1996

[51] Int. Cl.[6] .................................................. H04B 7/02
[52] U.S. Cl. .................... 375/347; 375/267; 340/825.44; 455/31.3
[58] Field of Search ........................ 340/825.44, 825.54; 375/347, 349, 345, 267; 455/67.1, 67.3, 135, 136, 137, 138, 226.1, 232.1, 249.1, 226.3, 303, 33.2, 33.1, 226.2, 220, 31.3; 370/252, 347; 371/37.1

[56] References Cited

U.S. PATENT DOCUMENTS

| | | | |
|---|---|---|---|
| 3,775,689 | 11/1973 | Greenwald | 370/252 |
| 4,099,121 | 7/1978 | Fang | 375/267 |
| 4,378,605 | 3/1983 | Baumann, Jr. et al. | 455/303 |
| 4,573,155 | 2/1986 | Currie et al. | 371/37.1 |
| 4,596,024 | 6/1986 | Thomson | 375/347 |
| 4,646,082 | 2/1987 | Engel et al. | |
| 4,823,123 | 4/1989 | Siwiak | |
| 4,825,193 | 4/1989 | Siwiak et al. | |
| 4,940,963 | 7/1990 | Gutman et al. | |
| 5,070,329 | 12/1991 | Jasinaki | |
| 5,093,924 | 3/1992 | Toshiyuki et al. | 455/33.2 |
| 5,153,582 | 10/1992 | Davis | |
| 5,184,349 | 2/1993 | Riordan | 370/347 |
| 5,224,150 | 6/1993 | Neustein | |
| 5,369,681 | 11/1994 | Boudreau et al. | |
| 5,404,569 | 4/1995 | Schwendeman et al. | |
| 5,475,863 | 12/1995 | Simpson et al. | 455/33.1 |
| 5,481,572 | 1/1996 | Sköld et al. | 375/347 |
| 5,507,022 | 4/1996 | Uomoto | 455/226.2 |
| 5,564,090 | 10/1996 | Beauchamp et al. | 455/220 |

*Primary Examiner*—Edwin C. Holloway, III
*Attorney, Agent, or Firm*—Christensen, O'Connor, Johnson & Kindness PLLC

[57] ABSTRACT

A two-way paging system includes one or more transmitters, a plurality of receivers, and at least one two-way personal paging unit or pager. The two-way pager receives pages from the transmitter, and sends response signals which are detected by the receivers. The response signals are in the form of digital packets, including forward error correction encoding and digital symbols that each consists of a predetermined number of bits. The receivers detecting the response signals decode the response packets to verify their accuracy and to identify the digital symbols. At the receivers, "accuracy indicators" can be associated with the detected symbols, providing an indication of the probability of accuracy. In one embodiment ("microdiversity receiver") two receiver components are provided at a single receiver site, with a separate antenna for each receiver component. Signals as received at the different components can be compared and have the accuracy indication information combined to increase the reliability of the system in detecting and decoding the pager response symbols. A central controller receives information from several receivers and similarly processes and analyzes it to determine the most likely response signal sent by a pager.

11 Claims, 18 Drawing Sheets

5,809,090

DIGITAL DIVERSITY RECEIVER SYSTEM

FIELD OF THE INVENTION

The present invention relates generally to paging systems, and more particularly to two-way paging systems.

BACKGROUND OF THE INVENTION

Most paging systems employ receive-only personal paging units. These paging units, called pagers, can receive pages, but cannot acknowledge whether a page has been received or transmit any other kind of information. To acknowledge page receipt, or transmit other information, the page recipient must communicate with the sender using another system, such as a telephone.

In contrast, two-way paging systems employ personal paging units that can receive pages and also acknowledge receipt of pages. Additionally, many paging system equipment providers are developing two-way paging systems that can transmit other information, such as responses to electronic mail ("E-mail") messages.

Consumers of telecommunication and paging services prefer two-way paging systems because these systems are more convenient for exchanging personal communications as compared to one-way, or receive-only paging systems. Thus, paging system equipment providers are working to produce reliable, cost-efficient two-way paging systems.

Generally, two-way paging systems include transmitters for sending pages to the personal paging units, receivers for receiving acknowledgments or other information from the personal paging units, and a central controller that is linked to the receivers and transmitters. In some two-way paging systems, the transmitters send pages to individual personal paging units with a command that a given unit acknowledge page receipt, or send other information, during a certain time slot or period. Thus, the transmitters can command personal paging units to transmit acknowledgments or return signals during different time slots to prevent congestion. Alternatively, a user of the personal paging unit may take some action to initiate a response signal, such as pressing a button on the paging unit. Such a personal paging unit may be programmed to transmit a negative acknowledgment signal if the user has not taken action within a specified time duration.

In such systems where pagers transmit information as well as receive it, the signals transmitted to the pagers can be made very powerful because the transmitters can be powered from a commercial AC power system, can be physically large and can use large antennas mounted on towers or buildings. This enables them to transmit to pagers which have small receiving antennas and which are dispersed over a wide area. Generally the area covered by a single large transmitter is referred to as a "cell".

The pagers, however, are limited in power that they can transmit back to fixed receiving sites due to the need to keep the pagers small, to use small antennas and to use moderate power from small batteries while retaining long battery life. These circumstances require very sensitive receivers at fixed receiving sites throughout the cell. Typically a plurality of receiving sites are required in the area covered by the transmitter. With multiple receivers, more than one receiver may detect a response signal from a pager.

Prior art systems have looked for the strongest pager response signal received at an individual receiver and declared it the "correct" received signal. Nevertheless, various conditions may interfere with the reception of the response signals by the receivers. Atmospheric conditions, building structures, competing signals, low battery power conditions, electromagnetic interference, and distances between the personal paging units and the receivers are examples of these conditions. Interference may result in the reception of an incorrect signal or a signal with some level of uncertainty as to whether the signal is correct. Several methods exist to reduce the interference and therefore the uncertainty. One is to increase the strength of the response signals. Increasing the strength of the response signal, however, generally requires increasing the size of the personal paging unit or decreasing its battery life. Another solution is to increase the geographic density of receivers. Costs and permit considerations limit the number and location of receivers that can be installed.

A solution that allows receivers to be limited to the existing locations of transmitters or that minimizes the number of additional receiver sites beyond the existing number of transmitter sites is desirable.

SUMMARY OF THE INVENTION

The present invention provides an improved system and method of facilitating the consistent and accurate reception of personal pager unit response signals. It accomplishes this by using a plurality of receivers, each having its own antenna, and by processing and evaluating the response signals detected at different receivers. A measure of signal strength can be a criteria in the evaluation process but, unlike the prior art, other criteria are used. In general, the system of the present invention includes transmitting response signals as packets having forward error correction encoding and one or more digital symbols, with each symbol being represented by a predetermined number of binary bits. The receivers decode the response packets and forward them to a central controller for evaluation. Based on the packets received from the receivers, the central controller determines the most probable response signal sent by the pager.

In one embodiment of the invention, two receivers can be contained within a single housing. Each receiver is coupled to its own antenna, with the antennas being located at or close to the same site but separated sufficiently for spacial diversity of reception. For example, if one of the antennas experiences multipath cancellation of received response signals, the other antenna will be far enough away so as to be outside the multipath null. The second antenna may thus be receiving the transmission more clearly and with greater strength. The dual receiver includes an information processor for combining the received signals from the two receivers to produce packets which appear the same as if emanating from a single receiver, but which have the benefit of a better likelihood of being correct. Such a dual receiver is called a "microdiversity" receiver.

At other receiver sites throughout the cell, a single receiver can be built into the equipment, coupled to a single antenna. Such a receiver still processes the received response packet from a pager, performs the error correction analysis, and forwards a packet to the central controller. Such a single receiver is called a "nondiversity" receiver.

In the preferred embodiment, the receivers are adapted for reliably detecting and processing both strong response signals, such as from nearby pagers, and weak response signals, such as from more remote pagers. The detected pager response signals are first filtered and amplified at the carrier frequency, the gain being fixed to accommodate the weakest signals expected. The filtered and amplified response signals are then downconverted to a lower frequency which is adjustable in small increments to match the center of narrow band bandpass, filters for noise rejection. After the second stage of filtering, the amplitude of each partially processed response signal can be attenuated prior to being downconverted to a much lower frequency and passed to an additional filtering stage and an analog-to-digital converter. The attenuation is fixed at the beginning of a response signal so that it stays constant during the signal but matches the operating parameters of the analog-to-digital converter. Otherwise, the maximum amplification required at the beginning of the processing (for the weakest anticipated signal) could result in a stronger signal having an amplitude outside the operating range of the analog-to-digital converter. The digital output of the analog-to-digital converter is fed to an information processor for demodulation, error correction, and determination of the most likely response signal sent by the pager.

In order to improve the likelihood of reception of the relatively weak pager transmissions, a plurality of either nondiversity or microdiversity receivers, or both, may be dispersed in a cell. The distances between receivers and their physical locations will be determined by the physical constraints of radio reception at the frequency of operation and such radio reception obstructions as hills and buildings. The object always is to provide reception over all of a given area with a minimum number of such receivers. In a typical system, it is likely that both a microdiversity receiver and the central controller will be located at a transmitter site for reasons of economy. There are many receivers for each central controller. For example, one central controller may serve up to 200 receivers.

The processor associated with a receiver makes an estimation of the digital symbol in the response packet from the pager, and also can provide an associated accuracy indicator value for each symbol. The combination of the estimated digital symbol(s) and associated accuracy indicator value(s) is called a "soft packet."

It is possible for one or more receivers to declare that they believe they have received an accurate reception of the response signal transmitted from a pager. For example, for the symbol having the highest accuracy indicator value, the decoding at the receiver can be verified by the forward error correction analysis and by the signal-to-noise ratio. The signal sent to the central controller in this situation does not include the accuracy indicator value and is called a "hard packet." In a microdiversity receiver having separate receiver components, a hard packet may be generated after analysis performed on a combination of the signals detected by the separate receiver components.

In the absence of a hard packet for a particular response signal, a receiver processor can send a soft packet to the central controller. The central controller may combine soft packet information so as to determine the most probable response signal transmitted by the pager. Such determination can involve summing the received accuracy indicator values associated with each of several possible response symbols.

By considering all received signals as capable of being combined to produce a correct output when none may be strong enough on its own, a system is provided for analysis of even weak received signals, thereby reducing the number of receiver locations needed for a particular cell. The system still retains the capability to declare that an individual receiver or receivers are receiving a strong and correct signal, therefore making the combining of signals unnecessary in that instance.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT SYSTEM

Figure 1:
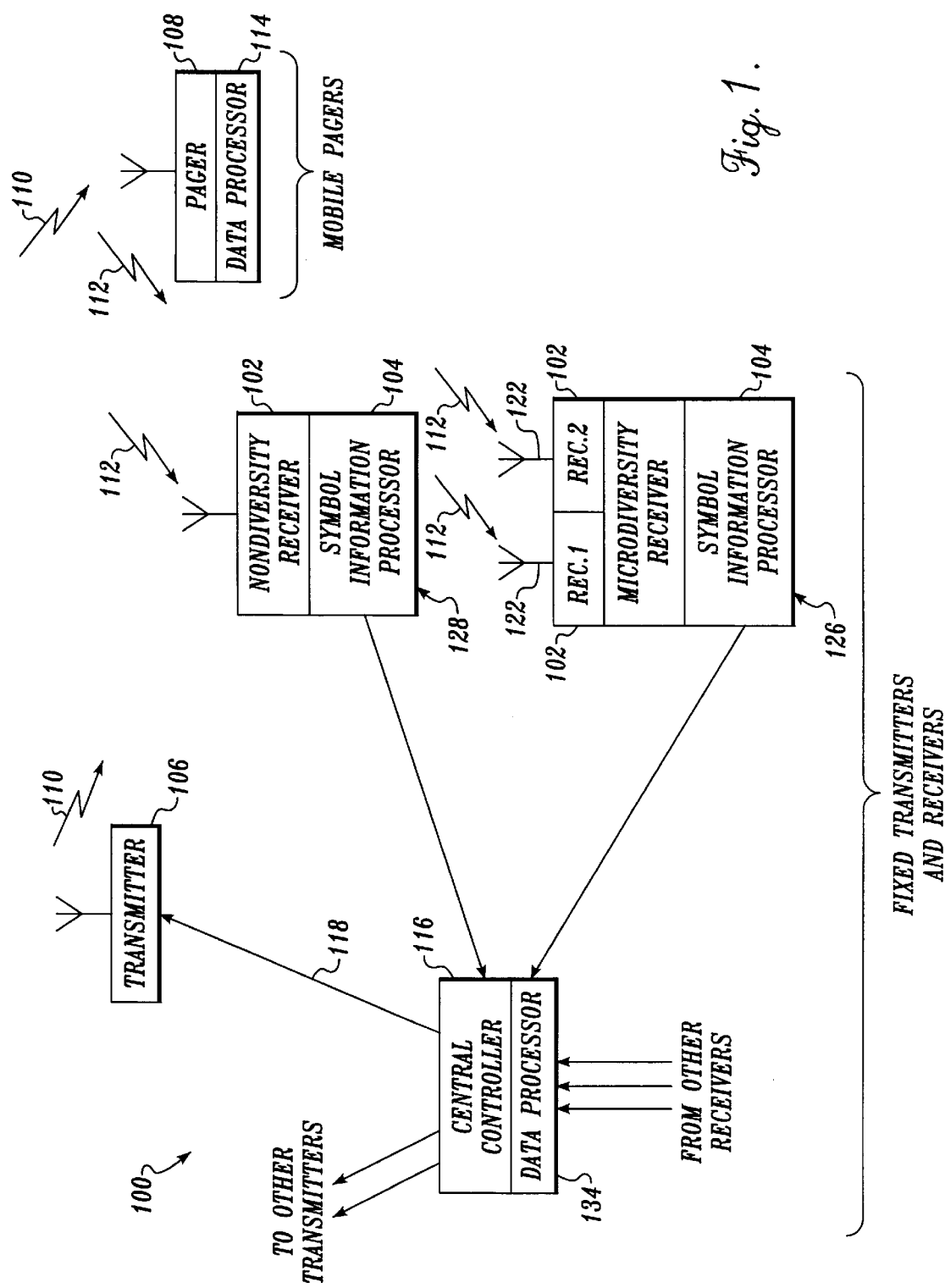
FIG. 1 is a block diagram of a digital diversity receiver system in accordance with the present invention, including a transmitter, mobile pager, central controller and receivers (microdiversity and nondiversity)

With reference to FIG. 1, a two-way paging system 100 in accordance with the present invention includes one or more transmitters 106, a plurality of receivers 102, and at least one two-way personal paging unit or pager 108. The two-way pager has the capability of receiving transmissions or pages 110 from the transmitter, and the capability of sending a response signal 112. The system may also include receive-only pagers, which do not have the capability of sending response signals. Each two-way pager 108 includes a data processor 114, such as a conventional microprocessor. Each receiver either includes a symbol information processor 104 or is linked to a symbol information processor 104, such as by a fiber-optic cable, radio channel or other communication link. The information processors are, in turn, linked to a central controller 116. The central controller includes a data processor 134 and associated computer memory.

In general, the central controller 116 actuates the transmitter 106 to send the pages 110, and evaluates whether valid response signals 112 have been received. The response signal 112 from a pager is in the form of a digital packet. The response packet includes forward error correction encoding and digital symbols that each consist of a predetermined number of bits. A receiver 102 that detects the response signal decodes the response packet to verify its accuracy and to identify the digital symbols. The central controller receives packets from different receivers that detected the response signal from the pager, and evaluates and/or combines the signals it receives to determine the most probable response signal sent by the pager.

Transmitters

Transmitter 106 generates radio signal transmissions or pages 110, in response to a message 118 sent from the central controller 116. Each page 110 identifies one of the personal paging units 108 to which the page is directed. A transmitter 106 may be co-located with a receiver 102 and/or the central controller 116, and can be of the type described in the commonly assigned patent application titled Linear Transmitter Using Predistortion, filed Feb. 14, 1996, listing inventors Charles Brian Cox et al., attorney Docket No. GLENPW-1-8882, which is expressly incorporated by reference herein.

Personal Paging Unit

The two-way personal paging unit 108, also referred to as a pager, receives pages 110 from the transmitter. In response, the pager broadcasts one or more response radio signals 112 in the form of digital data packets. The response radio signal may be sent automatically by the personal paging unit, in response to the received page. Alternatively, a user of the personal paging unit may take some action to initiate a response signal, such as pressing a button on the paging unit. A combination of automatic and user-initiated signals may also be sent, resulting in a plurality of response signals being sent by a single personal paging unit in response to a single page.

Response Signals

The response signal 112 generated by a pager in acknowledgment of receipt of a page 110 comprises a digital packet having a multi-bit synchronization segment, a data segment, a cyclic redundancy check (CRC) segment and a forward error correction (FEC) encoded segment. Error correction capabilities are included in the series of CRC parity bits and a series of Reed Solomon FEC parity bits.

The data segment of the response packet 112 contains a series of digital symbols, each having a predetermined number of bits. The pager sends a series of a plurality of possible symbols in each response packet, which can include a predetermined acknowledgment code. Each symbol is represented by a modulation of the radio signal, preferably by continuous phase frequency shift keying (CPFSK). It is desirable for individual pagers to transmit short messages so that more pagers can share a common radio frequency channel. This helps to minimize the total number of different radio frequency channels required by a paging system. One or more bit symbols can be used as long as the modulation scheme fits within the available frequency band.

More specifically, using CPFSK modulation, each symbol is transmitted on a different subfrequency, where the subfrequencies are centered around one main frequency. Minimizing the number of possible symbols reduces the number of bits per symbol and the number of subfrequencies needed for the transmission of response signals. The transmitter and receiver become more complicated as the number of bits per symbol is increased. Usually, one or two bit symbols are used. For 2n symbols, where the subfrequencies are centered around the frequency F, the symbol bits are sent on the subfrequencies:

$$F+\frac{d}{2}, F-\frac{d}{2}, F+\frac{3d}{2}, F-\frac{3d}{2}, \ldots, F+\frac{(2n-1)d}{2}, F-\frac{(2n-1)d}{2} \quad (1)$$

where d represents the distance between subfrequencies, each subfrequency representing one signal. The number of bits per symbol is given by:

$$\log_2(M) \quad (2)$$

where M is the number of levels or subfrequencies needed to represent the symbols in the modulation scheme. For example, four subfrequencies are needed to represent a two bit symbol, one for each possible combination of two bits. The four distinct symbols can be represented by 00, 01, 10, and 11, which can translate, to −3, −1, 1 and 3, for example. If the main frequency used is 900 MHz, and if 1,600 Hz is desired between subfrequencies, the subfrequencies used will be 900.0008 MHz, 899.9992 MHz, 900.0024 MHz, and 899.9976 MHz.

A single bit per symbol can be used, or more bits per symbol. For example, three-bit symbols allow eight distinct symbols, but would require eight levels of CPFSK modulation. If each level is separated by 1600 Hz, a range of 7×1600, or 11,200 Hz would be required. The frequency separation may then be reduced at the penalty of poorer performance in noise.

Microdiversity Receivers

In the present invention, a plurality of receivers 102 are capable of receiving the response radio signals from a pager 108. The present invention encompasses two configurations of receivers. In one configuration, a plurality of receivers 102 are co-located in a single housing and are electronically linked to a single information processor 104. This composite arrangement is called a "microdiversity receiver." In a microdiversity receiver (designated 126 in FIG. 1), a separate antenna 122 is provided for each of the separate receiver units 102. The separate antennas are in close proximity at the location of the microdiversity receiver, but are separated by a distance greater than one wavelength of the received radio response signal to prevent the antennas from interacting with each other. The object is to provide the separate antennas at the same fixed receiver site, but spaced apart sufficiently that there is a substantial likelihood that one antenna will receive a response signal more clearly and with greater strength if interference of any type, such as multipath cancellation, prevents a clear strong reception at the other antenna. In a representative installation, the antennas may be spaced about twenty feet apart, several wavelengths for a representative response transmission frequency of 900 MHz. The aim is to keep the correlation of the two signals low.

Figure 2:
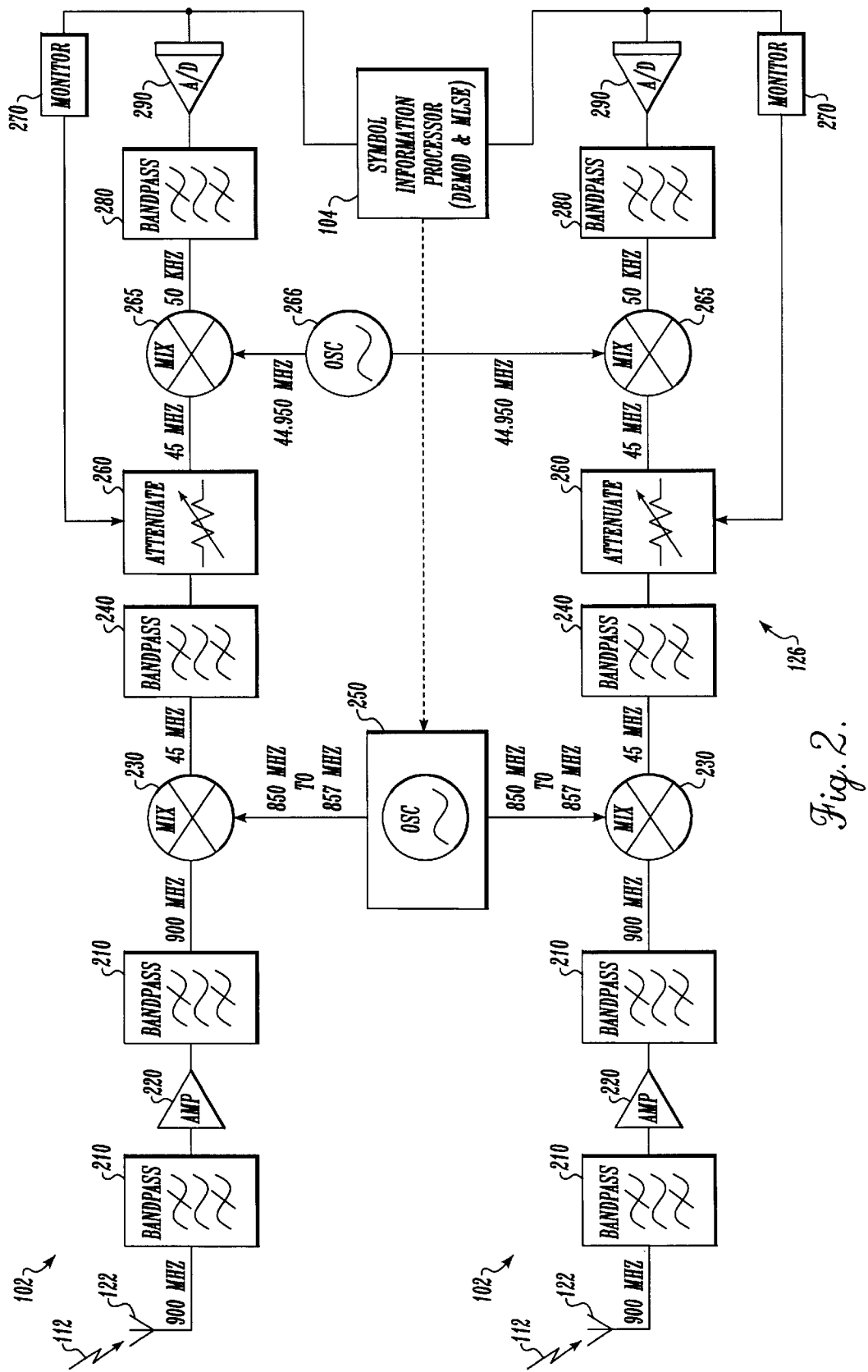
FIG. 2 is a block circuit diagram of a microdiversity receiver in accordance with the present invention.
Figure 3:
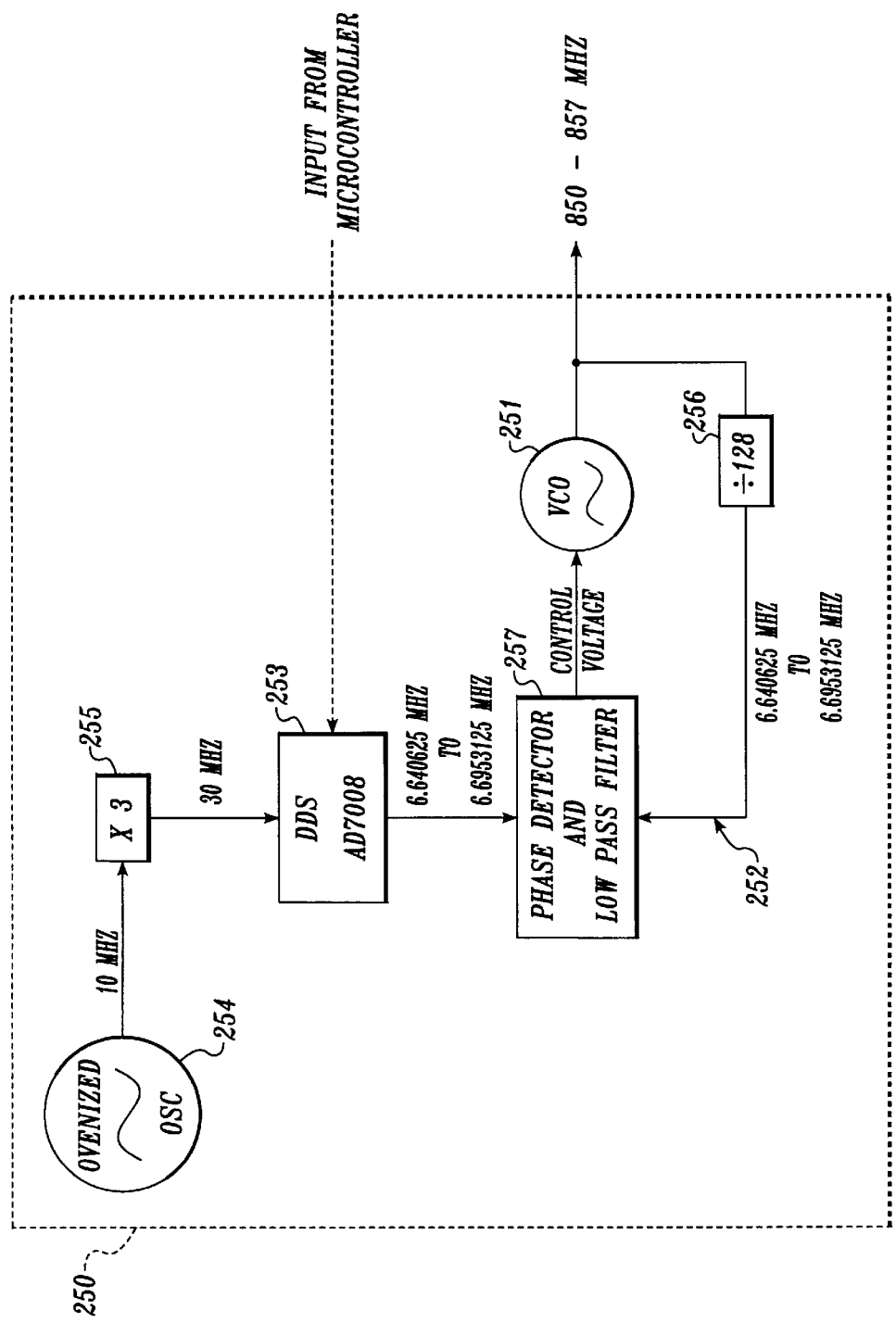
FIG. 3 and FIG. 4 are more detailed block circuit diagrams of components of the receiver of FIG. 2.
Figure 4:
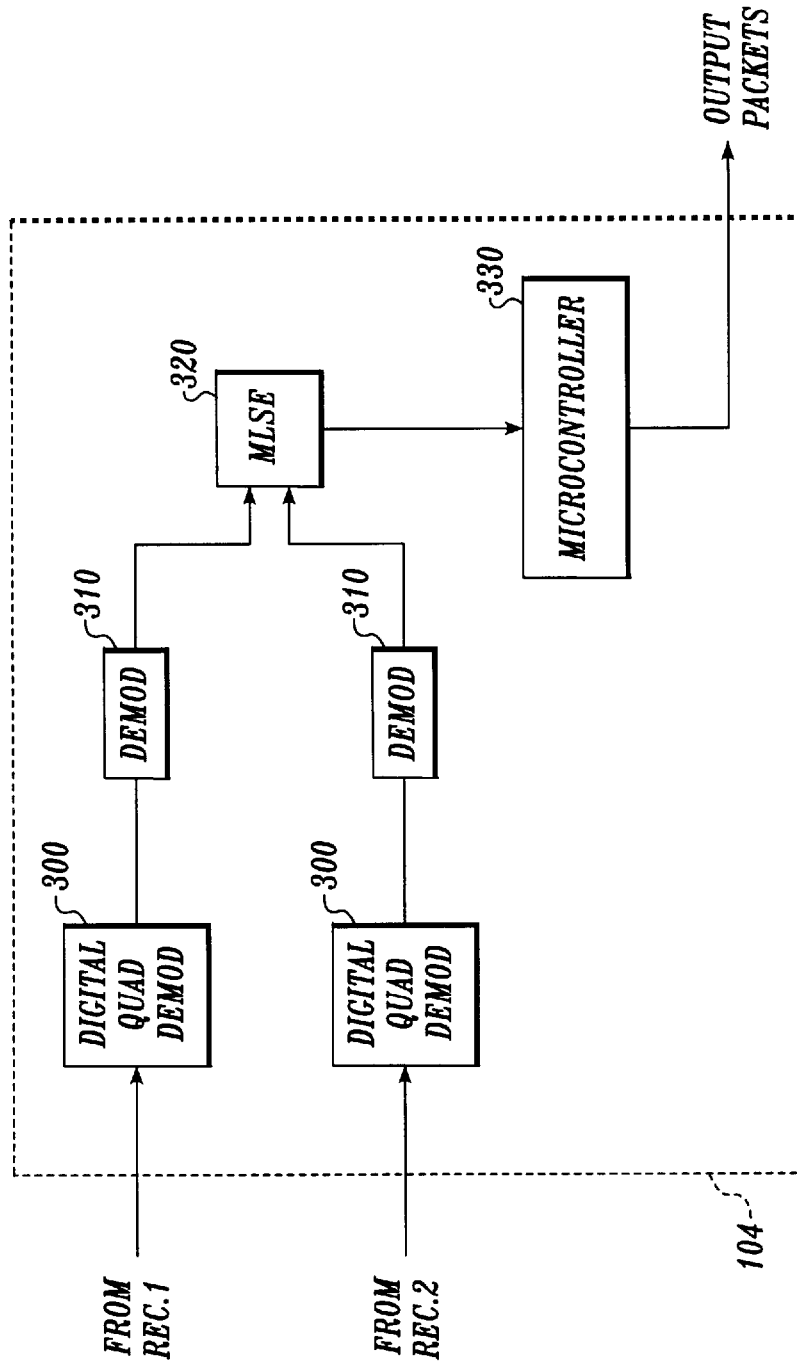

The microdiversity receiver 126 is shown in block diagram form in FIGS. 2, 3 and 4. With reference to FIG. 2, for each receiver component 102, the radio response signal 112 from the pager is detected by that component's antenna 122. The received response signals are filtered by bandpass filters 210 centered at the response transmission frequency, such as 900 MHz. Such signals also are amplified by low noise amplifiers 220 to increase the strength of the received response signals. As detected at the antennas, the response signals will vary in strength over a wide range based on the distance from the pager to the receiver and other factors discussed above. The dynamic range capability of the front end of the receiver 102 must be sufficient to accept this wide range of input without distortion of the strongest anticipated response signal and without excessive noise masking the weakest anticipated response signal. Preferably this capability is accomplished without adjustment of gain at this point in a receiver 102 because many short messages from different pagers may be received in succession with widely varying signal strengths. The gain needs to be at maximum for the weakest signals to be detected as they commence transmission in a time slot.

The bandpass filtering at 210 serves to reduce the receiver input noise bandwidth and acts as the image rejection filtering for the first downconversion stage. The pass band of the filters 210 nevertheless needs to be wide enough to allow reception of a range of channels that may be used in the paging system, as described above with reference to CPFSK modulation of the response symbols. Such filtering can be in two stages, before and after low noise amplification achieved by amplifiers 220.

Following the second stage of filtering, a first mixer 230 mixes each received signal down to an intermediate frequency much lower than the response signal transmission frequency. In a representative embodiment, the intermediate frequency can be about 45 MHz. A single local oscillator 250 can be coupled to the two mixers 230. This ensures that there is no frequency offset between the two downconverted signals. However, the receiver units are also capable of being configured with two separate local oscillators to allow operation of the separate receiver units 102 on separate channels, such as would occur if the separate receivers were not co-located, as described in more detail below with reference to a "nondiversity receiver."

In the preferred embodiment of a microdiversity receiver, the local oscillator 250 has the components shown in FIG. 3, including a voltage controlled oscillator (VCO) 251, a phase locked loop 252 and a direct digital synthesizer (DDS) 253. In a representative embodiment, a model AD7008 DDS manufactured by Analog Devices can be used. The DDS is locked to a lower frequency, such as 10 MHz, ovenized reference oscillator 254 through a multiplier 255. Typically, the ovenized reference oscillator is contained in an external radio base station controller unit. The DDS provides a precise reference frequency output at 1-128th of the required voltage-controlled oscillator output frequency of around 850 MHz. The actual voltage-controlled oscillator output frequency of around 850 MHz is divided by 128 (block 256) in order to implement the phase locking of it (block 257) to the DDS. The advantage of using a DDS to lock the local oscillator 251 is the ability to control the frequency in small increments.

Returning to FIG. 2, the local oscillator 250 is used to select the frequency that is to be received, and the DDS allows the fine frequency adjustment capability used to center the intermediate signal frequency precisely in the narrow pass band of crystal bandpass filters 240 immediately downstream of the mixers 230. For example, if the incoming frequency is not precisely centered in the passband, distortion would otherwise occur through the filtering of one edge or the other of the incoming mixed signal.

The intermediate frequency (45 MHz) signal from each mixer 230 is filtered through the associated narrow band crystal bandpass filter 240 for image rejection in preparation for a second downconversion to a very low intermediate frequency, described below. The narrowness of these filters is a reason for the need to use the DDS to fine adjust the intermediate frequency of the received signals.

From the filters 240, the intermediate frequency (45 MHz) signal is fed to a digitally selectable step attenuator 260. The step attenuator can reduce the strength of the incoming signal in several discrete steps. In a representative embodiment, a M/A Com AT220 step attenuator can be used. These attenuators each can be selected to give up to 30 dB of attenuation in 2 dB steps. In the representative embodiment, a pair of these step attenuators are configured to give seven selectable 10 dB steps from 0 dB to 60 dB.

The attenuated signal is mixed down from the intermediate frequency (45 MHz) to a very low second intermediate frequency, such as 50 KHz, in a mixer 265. Both mixers 265 can be driven from a single fixed local oscillator 266, such as at 44.950 MHz. Again, use of the single local oscillator ensures that there is no frequency offset between the two downconverted response signals.

The downconverted signal at the second intermediate frequency (50 KHz) is passed through a bandpass filter 280 centered at the lower second intermediate frequency for image and noise rejection. Thereafter, the filtered signal is directly sampled by an analog-to-digital converter 290 to produce a single real digitally sampled representation of the received response signal. Such converters can be type DSP102 available from Burr-Brown. Each converter 290 has 18-bit resolution which allows it to represent a wide input dynamic range accurately. At this resolution it is not possible to find exceptionally fast A-to-D converters, hence the very low second intermediate frequency. The dynamic range is wide, but is not sufficient to provide enough bits of resolution to encompass the even wider range of received signal levels from pagers. Consequently, each attenuator 260 is set to minimum attenuation after the reception of a burst from any pager. As the next pager burst of signal is received, the outputs of the A-to-D converters are monitored as represented by blocks 270 in FIG. 2. In practice, the monitoring function can be achieved in programmable microprocessors incorporated in the shared symbol information processor 104 described below. At any rate, the monitors 270 decide whether to change the attenuation (blocks 260) to bring the input signal level down to a point where it is not clipped by exceeding the A-to-D input range, based on the digital sample amplitude distribution. This setting is made low enough that the amplitude distribution should not exceed the dynamic range of the A-to-D converter even if the amplitude distribution changes during the packet. This requires making the attenuation greater than that required to just fit the dynamic range. The decision is made and the selection is done quickly during the synchronization segment at the beginning of the burst of transmission from each pager. It is essential that the attenuation of the signal applied to the A-to-D converter 290 does not vary during reception of the succeeding data, CRC or FEC segments of the packet. The advantage of this system is that the attenuators 260 are used to automatically decrease the received power from pagers having strong signals, such as pagers close to the receiver. As previously described, the receiver front end gain has to be kept at maximum to enable continuous detection of weak signals. This would not be possible if the front end gain were reduced, particularly if strong and weak response signals are received in adjacent time slots.

By comparison, in a prior art automatic gain control system, the gain is often under analog control whereby the average incoming signal level is used to adjust gain. The result is a time lag in the gain response which, where short bursts of transmission of widely varying strengths are received, would result in the gain lagging behind that which is required. The gain would also change during reception of a particular signal.

It is important for the gain to be steady during the reception of each pager response signal to enable it to be received without the added degradation of a varying signal level due to a nonoptimal automatic gain control system. This kind of variation would confuse the decision algorithms used in the present invention, described in more detail below. It is also important for the signal level not to be too heavily clipped by being applied at a high level to the A-to-D converters. If the signal matches the input range of the A-to-D converter, there is more information to enable the decision algorithm to eliminate the effects of interference which may detrimentally affect even a strong response signal.

The steady level digital signals from the A-to-D converters 290 are fed to a single information processor 104, shown diagrammatically in FIG. 4. Each digital signal is first processed by a digital quadrature demodulator 300 which converts the single real signal into its complex in-phase I and quadrature Q components. As compared with analog equivalents, digital quadrature demodulation has the advantage of freedom from amplitude and phasing imbalance, which can result in poor separation of the I and Q components over time, and imbalances caused by temperature changes. Demodulation, and all functions after the A-to-D conversion, preferably are performed in programmable logic devices such as the Xilinx 5206 Field Programmable Gate Array, and/or implemented in software in digital signal processing (DSP) microcontrollers. Four Texas Instruments TMS320C32 DSP microcontrollers and supporting software can be used to implement the functions of demodulation (represented by boxes 310) and maximum likelihood symbol estimation (MLSE) (represented by box 320) of the signals, described in more detail below. The demodulation and MLSE functions can be shared in the DSP microcontrollers for both receiver components 102. For example, the digital quadrature demodulation (box 300) can be done serially in the same hardware using time division multiplexed processing.

The microdiversity receiver is controlled by a microcontroller 330, such as a Motorola 68360. The microcontroller 330 is used to program the synthesizer dividers to set the operating frequency of the nominally 850 MHz local oscillator. The microcontroller also monitors the phase locked loops for an out of lock alarm condition, and controls the programming and ordered startup of the TMS320C32 DSPs. Various internal DSP hardware and software functions are monitored for faults or processing errors, and appropriate resetting or reprogramming controlled to attempt to remedy the problem.

Microdiversity Receiver Demodulation

Within the shared information processor 104 of the microdiversity receiver 126, demodulation of the processed pager response signal detected by each receiver comprises: (1) determining whether or not each signal has a predetermined minimum average signal-to-noise ratio for the time slot under consideration; (2) decoding the digital symbols of the response packet (i.e., determining the most likely response symbols received); and (3) determining whether or not the CRC and Reed Solomon parity bits decode without uncorrectable errors.

Signal-to-Noise Ratio

Figure 5A:
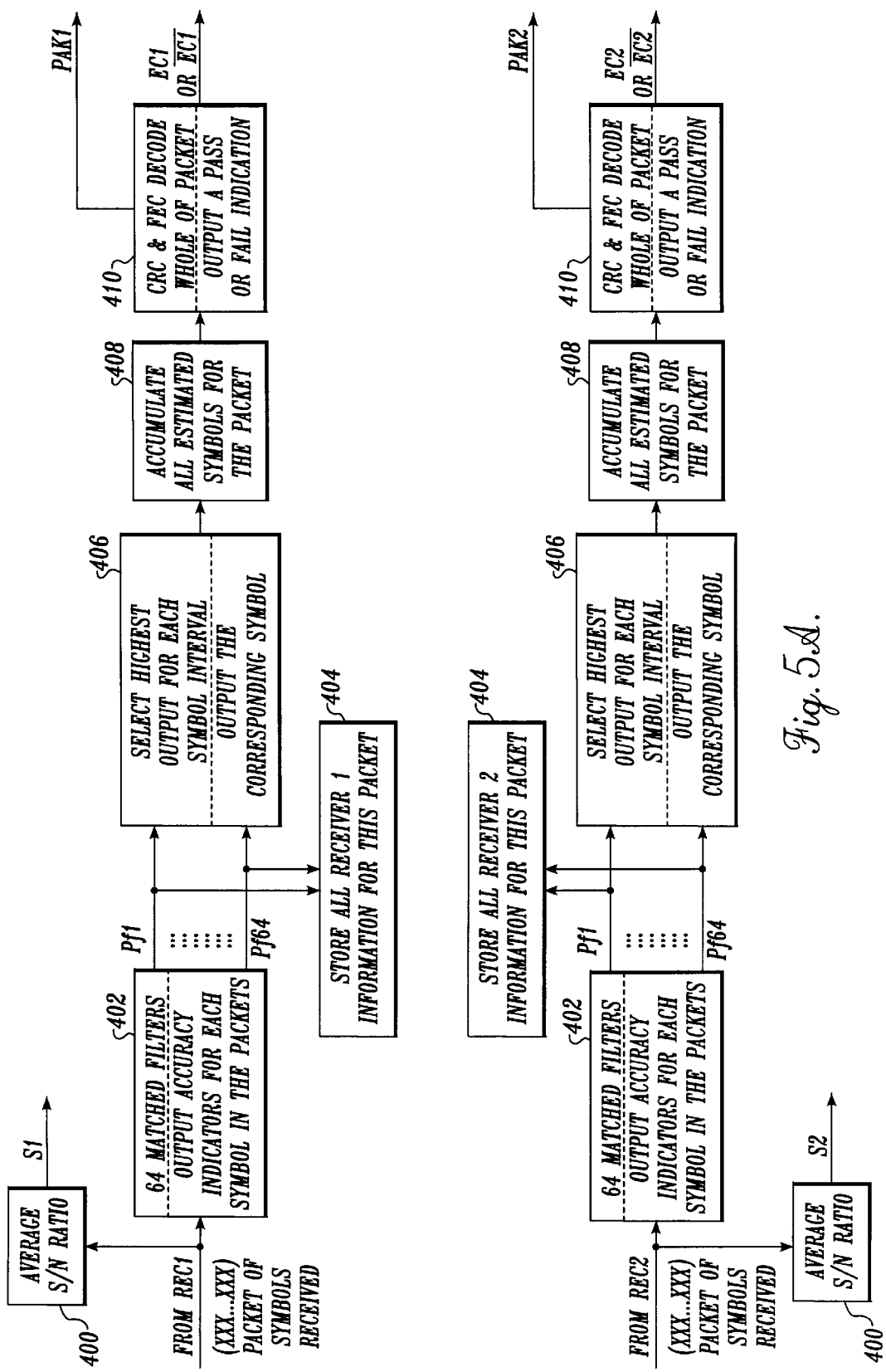
FIGS. 5A and 5B are block diagrams illustrating processing of pager acknowledgment symbols in a microdiversity receiver in accordance with the present invention.

With reference to FIG. 5A, the raw digital signals from the two receiver components ("REC1" and "REC2") are analyzed for signal-to-noise ratio as represented by blocks 400. The process of calculation of the signal-to-noise ratio involves three steps. The background noise floor is calculated, then the signal strength of the packet is measured. This is a more useful value for measurement of the received packets than just the signal strength, since factors contributing to noise are automatically taken into consideration. The signal-to-noise values S1 and S2 are output to the MLSE logic, as described below.

Decoding

Decoding of each digital symbol of the response packet follows a process of maximum likelihood sequence detection, described in *Digital Phase Modulation,* by Anderson, Aulin, and Sundberg (Plenum Publications, 1986—see particularly chapter 7). The result is an "estimated symbol," which is a determination of the most likely symbol(s) transmitted by the pager.

In one embodiment, the symbol decoding process is based on a classic paper by William Osborne and Michael Luntz, *Coherent and Noncoherent Detection of CPFSK,* IEEE TRANSACTIONS ON COMMUNICATIONS, COM-22, No. 8, (August 1974) at 1023. The demodulator uses a bank of matched digital filters, preferably complex baseband digital finite impulse response low pass filters which are linear phase and can be designed to have very sharp cutoff. A signal is passed through a matched filter bank, where the signal is observed for a time interval or "window" sufficient to include at least one symbol. However, the window must encompass multiple symbol intervals to optimally detect a specific symbol. The number of filters N in the filter bank is found by using:

$$N=M^w \qquad (3)$$

where w is the observation window length in number of symbols and M is the number of levels in the modulation scheme. Each filter is matched to a specific sequence of symbols for the entire window. For example, a preferred window length is three symbol intervals, encompassing the interval during which the symbol is expected and both the preceding and succeeding symbol intervals. With four levels of CPFSK modulation, as would be used for a two bit symbol, each filter bank must include 64 ($4^3$) distinct digital filters. There are four possible bit combinations for each symbol interval, and three intervals in a window, making 64 possible combinations of three symbols.

Using the above demodulating scheme where the observation window length w=3 and a symbol consists of two binary bits, a matched filter output signal representing the associated accuracy indicator value P is produced for each sequence of three symbols ($\alpha_1$, $\alpha_2$, $\alpha_3$), as represented by block 402 of FIG. 5. In the drawing, $P_{f1}$ represents the accuracy indicator value for the first filter (i.e., a first possible combination of symbols $\alpha_1$, $\alpha_2$, $\alpha_3$), $P_{f2}$ represents the value for the second filter (a second possible combination), and so on. In general, each accuracy indicator value $P_{fn}$ expresses numerically the degree of correlation between the symbol sequence ($\alpha_1$, $\alpha_2$, $\alpha_3$) to which the associated filter is matched and the digital signal passed through the filter. In a noise-free environment, only the filter matched to the actual sequence of symbols would give a high output. In the actual environment, values range based on the detected degree of correlation. Thus, each filter outputs a number for each symbol interval in time. A succession of these numbers is produced, one for each symbol that goes to make up a packet. As represented by box 404 of FIG. 5, the complete array set of numbers 64 wide by the packet length long is stored for later calculation, if required by the MLSE logic.

As represented by box 406, the outputs of the matched filters are examined for each symbol to determine which filter provided the highest accuracy indicator. The filter with the highest accuracy indicator for each observation window is presumed to identify the symbol k of interest, i.e., the middle symbol for an observation interval of a length of three symbols. The presumed "most likely" symbols k are accumulated for an entire packet (including CRC and FEC parity bits) as represented by block 408.

Error Checking

When an entire packet (data segment, CRC and FEC) has been accumulated, it is passed for error-checking (block 410). Error detection and correction are performed conventionally. See, for example, Michelson, Levesque, *Error-Correction Techniques for Digital Communication* (John Wiley & Sons, Inc. 1985). For each received packet, an error flag (EC1 or EC2) is set to indicate whether or not that signal has passed error decoding. Correctable errors are corrected at this stage, and the most likely symbols of the data segment are output (PAK1 for receiver 1 and PAK2 for receiver 2). The packets consisting of the most likely or estimated data symbols generated in this manner are called "hard packets."

In summary, outputs resulting from microdiversity demodulation include: the signal-to-noise ratio, S1 for receiver 1 and S2 for receiver 2; error flags EC1 (or $\overline{EC1}$) and EC2 (or $\overline{EC2}$) indicating whether the packets from receiver 1 and receiver 2, respectively, have passed error decoding; and the data symbol hard packets, PAK1 and PAK2.

In addition, another set of outputs is provided if needed by combining the stored information from the matched filter banks (i.e., the filter output information stored at blocks 404). The stored information is recovered as represented by blocks 412 of FIG. 5B. The information for each symbol-filter combination for REC1 is combined with the corresponding information for REC2 (block 414). Thus, for each of the sixty-four pairs of accuracy indicators, the values are combined, and this is done independently for each symbol, i.e., on a symbol-by-symbol basis for each symbol of the packet without reference to the results of preceding calculations or processing to detect the symbols or estimates of subsequent processing or detection. Thereafter, the highest combined accuracy indicator is determined for each symbol (block 416), and the most likely symbol k is determined based on such highest combined indicator. The estimated symbols are accumulated for a packet (block 418), and then are passed for error correction and decoding (block 420), as described above. After error decoding and correction, the estimated symbols are output as a "combined" hard packet (PAKC). Similarly, an error decoding signal is supplied, ECC or $\overline{ECC}$. If a reliable hard packet cannot be generated and a soft packet has to be output, then the accumulated signals from block 418 are output as $PAKC_{unc}$ (uncorrected) together with soft symbol information (from block 422).

Figure 5B:
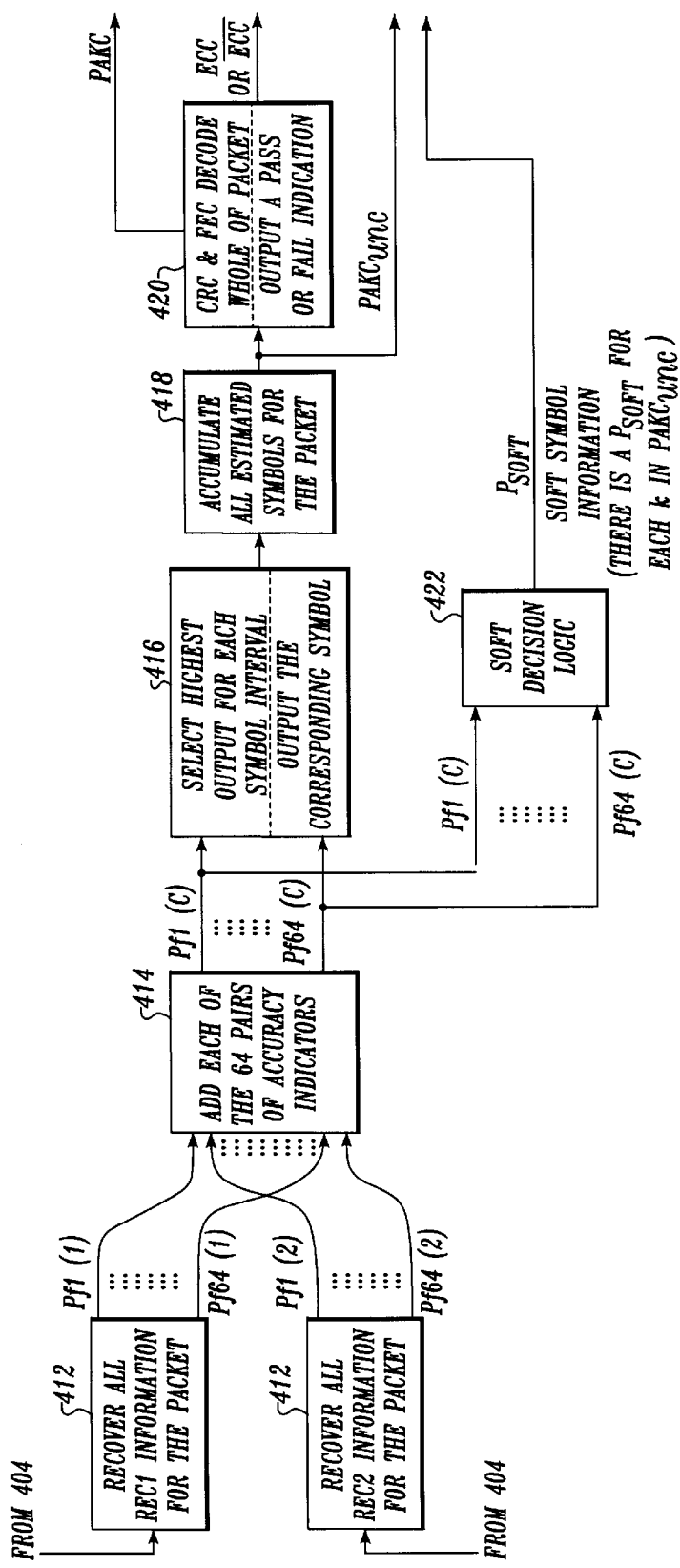

Still with reference to FIG. 5B, at block 422 the combined accuracy indicator information is used to generate an estimate $P_{soft}$ of the likelihood that each uncorrected data symbol k is accurate. A $P_{soft}$ value is determined and associated with each data symbol of the packet. The combination of the estimated symbols k and their associated $P_{soft}$ values is referred to as a "soft packet." Soft packets are immediately distinguishable from hard packets by inclusion of the $P_{soft}$ information, whereas the hard packets consist only of the estimated symbols.

Calculating the $P_{soft}$ Value

In one embodiment of the present invention, the soft symbol information is simply the identification of the most likely symbol, k, and the maximum sample of the combined matched filter outputs.

In another embodiment of the current invention, a weighted correlation indicator is calculated. For M levels, or number of subfrequencies used, and an observation window length of w symbols, and where $P_{km} = \max\{P_{f1}, P_{f2}, \ldots, P_{fn}\}$ for the combined filter outputs, the weighted correlation indicator is:

$$\alpha_k = \frac{P_{km}}{\left(\frac{1}{M^w - 1}\right) \sum_{\substack{fn=1 \\ (fn) \neq (km)}}^{M^w} P_{fn}} \quad (4)$$

The weighted correlation indicator as given above is equal to the largest of the filter sums divided by the mean of all other filter sums. In this case the soft symbol information for each estimated symbol is (k, $\alpha_k$), i.e., $P_{soft}$ for estimated symbol k is $\alpha_k$.

For example, where M=4 levels and w=matched filter window length=3 symbols, $$\alpha_k = \frac{P_{km}}{\frac{1}{63} \sum_{\substack{fn=1 \\ (fn) \neq (km)}}^{64} P_{fn}} \quad (5)$$

Conditional Probability of Symbol Error

In a preferred embodiment of the current invention, two intermediate steps are performed after calculation of the weighted correlation indicator at the receiver. The correlation indicator as calculated in equation (4) is converted into a conditional probability of symbol error, which is a measure of the probability that the estimated symbol k is incorrect. In one embodiment, the conversion is made by using a lookup table consisting of indicator values and corresponding probabilities of symbol error.

The table can be created by performing simulations that produce statistics mapping the probability of error with correlation indicator values. The conditional probability of symbol error is considered to be conditioned by the channel state $s_n$. The channel state $s_n$ is defined as:

$$s_n = (R_n, N_0) \quad (6)$$

where $R_n$ is the estimated multiplicative distortion for the symbol k and $N_0$ is the gaussian noise power spectral density. The fading amplitude is assumed to be approximately constant during a symbol interval.

Standard curve fitting is then performed on the measured probabilities to find an equation giving the probability as a function of the correlation indicator. The equation is used to complete a table mapping correlation indicator values with probabilities of error. In one embodiment the probabilities of error values range from 0 to 1, and the probability of error value is represented as a six bit binary number. Thus, the represented value would be in the range of 0 to 63 (decimal).

The table is used to convert a correlation indicator into a conditional probability of symbol error at the receiver's symbol information processor. This new value is used as the $P_{soft}$ accuracy indicator for estimated symbol k.

Microdiversity Receiver MLSE Logic

Ultimately, a packet of information pertaining to the most likely estimated symbol is sent to the central controller. The logic followed in deciding the information to be sent is represented in FIGS. 6–10.

Figure 6:
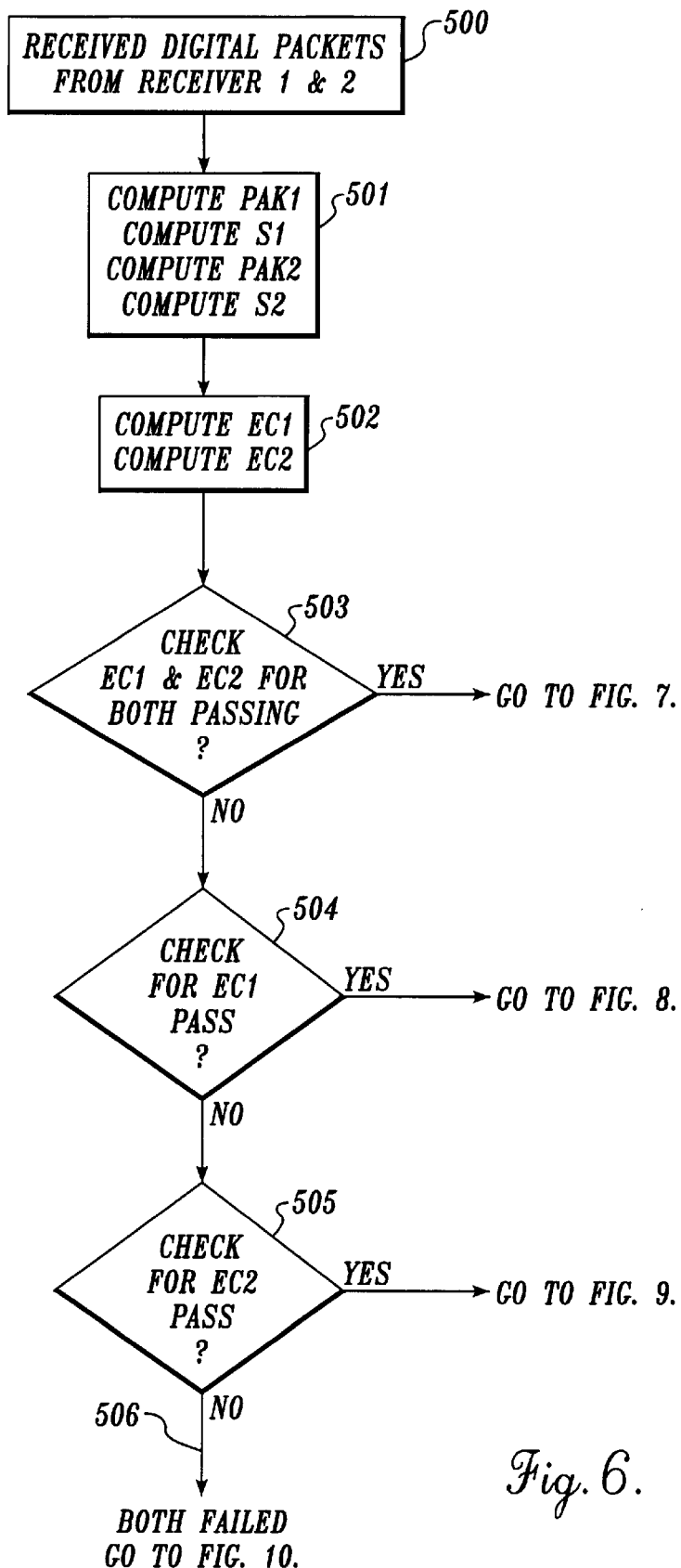
FIGS. 6–10 are flow diagrams illustrating the logic employed by a microdiversity receiver in accordance with the present invention.

With reference to FIG. 6, when packets have been received from both receiver components (block 500), hard packets PAK1 and PAK2, and signal-to-noise ratio values S1 and S2, are computed (block 501). Next, EC1 (or $\overline{EC1}$) and EC2 (or $\overline{EC2}$) are computed (block 502). The following steps depend on the results of the error checking, one path being followed if both signals pass error checking (block 503), other "mirror image" paths being followed if one signal passes error checking but the other does not (blocks 504 and 505), and another path being followed if both signals fail error decoding (path 506).

Figure 7:
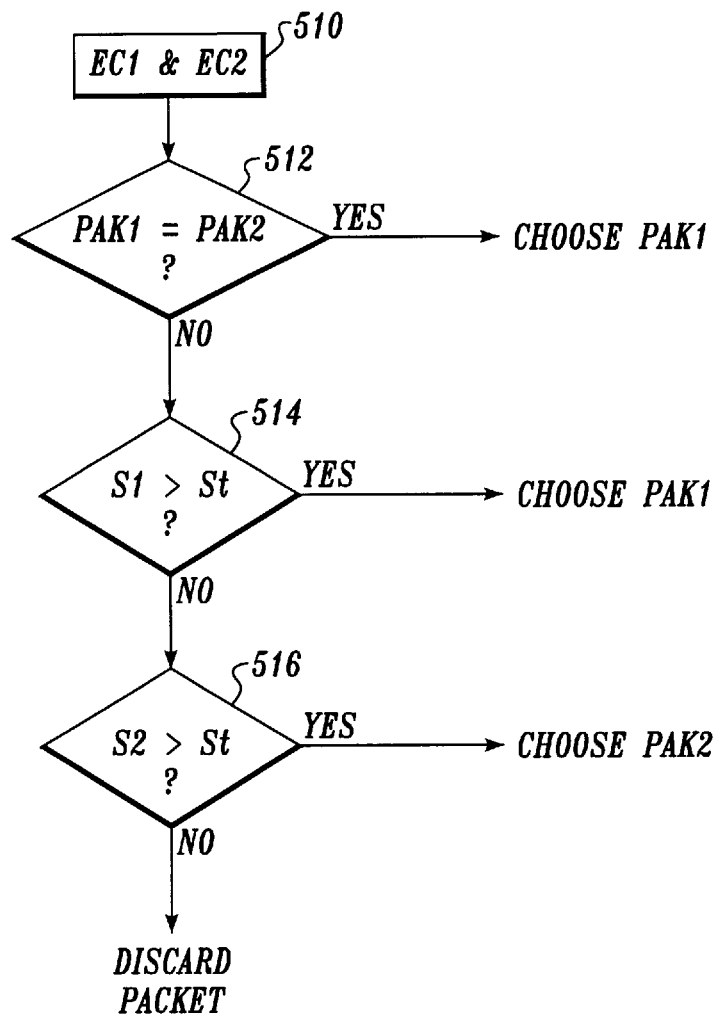

Referring to FIG. 7, if both response signals have passed error decoding (block 510), a determination is made as to whether identical hard packets are present (decision box 512). If so, PAK1 is arbitrarily selected to be sent to the central controller as a hard packet. If not, the logic proceeds to box 514 for a determination as to whether the average signal-to-noise ratio for the first signal (S1) is greater than a threshold St. The signal-to-noise threshold value St is computed during system design by using theoretical calculation as well as simulations and is stored in the receiver. It is chosen so that the false packet reception rate is minimized and the packet throughput is maximized. This value can be adjusted later in light of actual system operating experience. If S1 exceeds St, PAK1 is selected to be sent to the central controller as a hard packet. Otherwise, the logic proceeds to box 516 for a determination of whether the average signal-to-noise ratio of the second signal (S2) is greater than the threshold, in which case PAK2 is sent to the system controller. Failure of all of these indications results in sending no signal ("discard packet").

Figure 8:
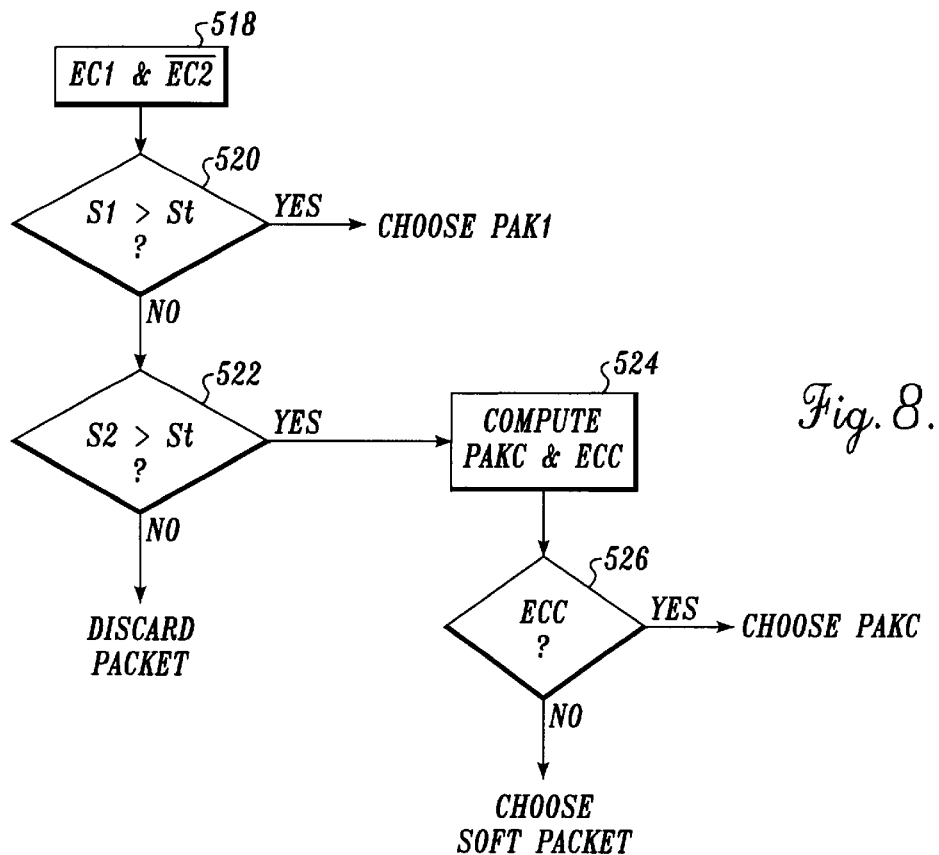
Figure 9:
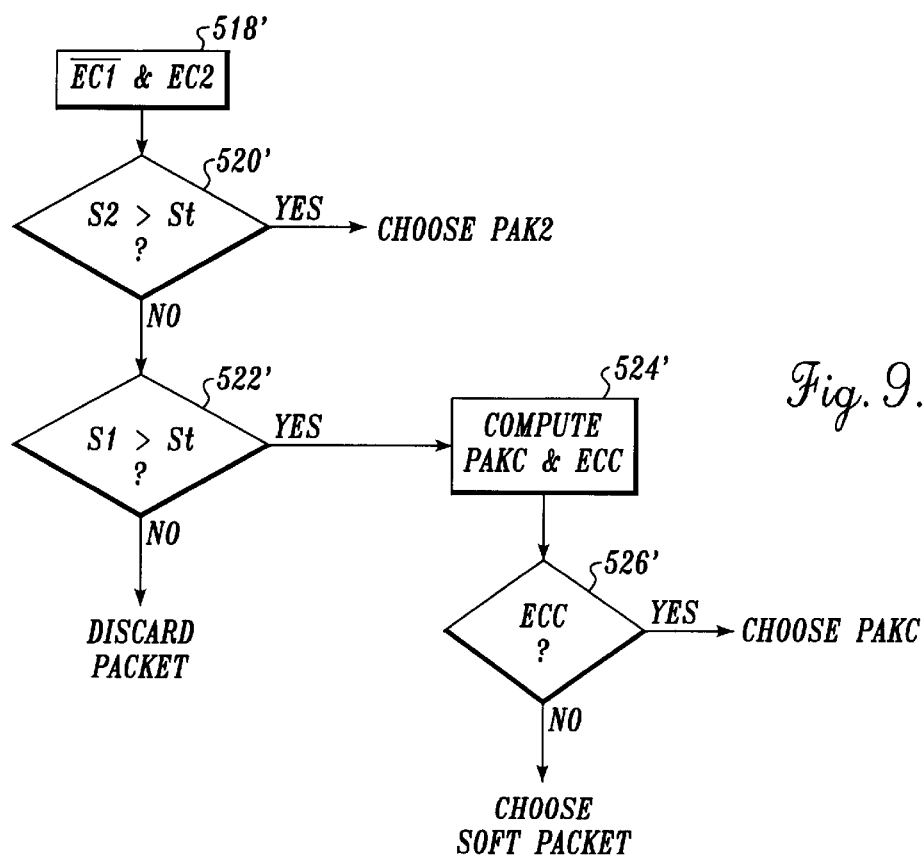

FIGS. 8 and 9 show the logic if only one of the signals has passed error decoding (boxes 518 and 518'). In that case, a determination is made as to whether the signal passing decoding has an average signal-to-noise ratio greater than the threshold (box 520 or 520'). If so, the appropriate hard packet, PAK1 or PAK2, is sent to the central controller. Otherwise, a determination is made as to whether the average signal-to-noise ratio of the other signal is greater than the threshold (boxes 522 and 522'). If not, no information is sent ("discard packet"), whereas if the signal not passing error decoding has an average signal-to-noise ratio greater than the threshold, the combining of the two signals described above with reference to block 414 of FIG. 5B is performed. Packet PAKC is generated and the combined signal is error checked as indicated by blocks 524 and 524' of FIGS. 8 and 9. An evaluation is made as to whether the combined signal passes error decoding (boxes 526 and 526'). If the combined signal passes error decoding, the estimated symbol of the combined signal is sent to the central controller as a hard packet (PAKC). Otherwise, a soft packet (PAKC$_{unc}$) is sent to the central controller, consisting of the estimated symbol k and an accuracy indicator P$_{soft}$ for each data symbol of the packet.

Figure 10:
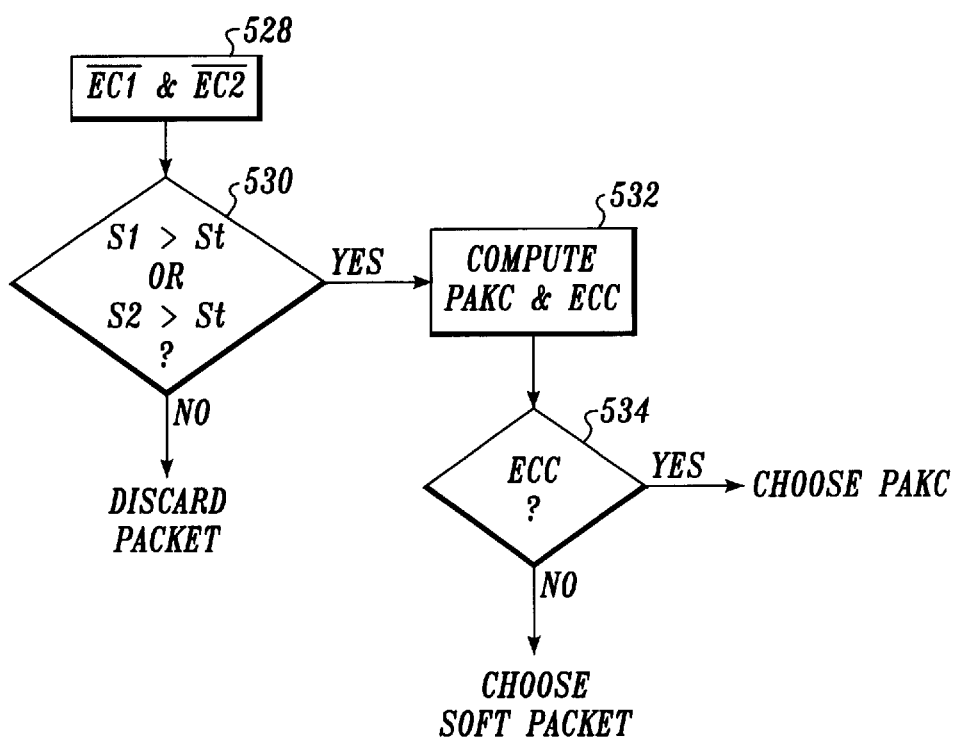

With reference to FIG. 10, if neither of the two individual signals passes error decoding (block 528), a decision is made as to whether either signal has an average signal-to-noise ratio above the threshold (box 530). If not, no packet is sent to the central controller ("discard packet"). If either of the individual signals has an average signal-to-noise ratio greater than the threshold, the signal combining is performed (block 414 of FIG. 5B), PAKC and the error signal (ECC or $\overline{ECC}$) are generated and the combined signal is error checked, as indicated by box 532 of FIG. 10. An evaluation is made as to whether the combined signal passes error decoding (box 534). If so, the estimated symbol of the combined signals is sent to the controller as a hard packet (PAKC), whereas if error coding has not been passed by the combined signal, a soft packet (PAKC$_{unc}$) is sent to the central controller, consisting of the estimated symbol k and accuracy indicator P$_{soft}$ for each symbol of the packet.

Nondiversity Receiver

With reference to FIG. 1, in addition to the microdiversity receivers 126 having more than one receiving component and more than one antenna, the present invention can utilize one or more nondiversity receivers 128, each of which has only a single receiver component 102. The receiver component 102 of a nondiversity receiver is the same as for a single branch of the block diagram of FIG. 2, including antenna 122, bandpass filters 210, low noise amplifier 220, mixer 230 controlled by an oscillator 250 (preferably of the type shown in FIG. 3), narrow band filter 240, step attenuator 260, second mixer 265 controlled by a local oscillator 266, band pass filters 280, and analog-to-digital converter 290. The output of the analog-to-digital converter is monitored (block 270) for attenuation adjustment (block 260). As previously described, attenuation is adjusted at the beginning of a packet, during the synchronization segment, and fixed for the remainder of the packet. Following reception of a packet, attenuation is set at minimum in case a weak packet is next received.

Figure 11:
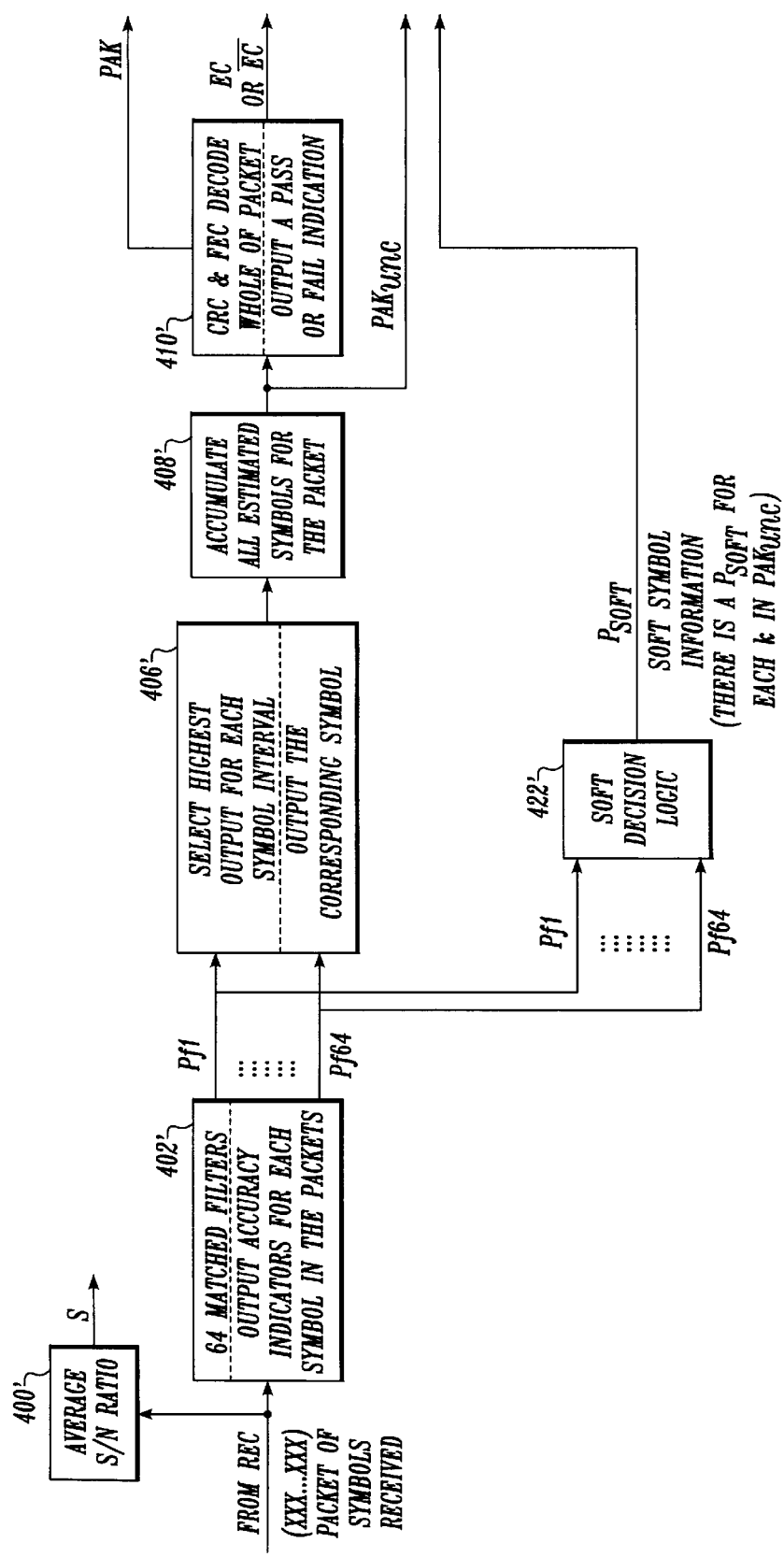
FIG. 11 is a block diagram illustrating processing of pager acknowledgment signals in a nondiversity receiver in accordance with the present invention.

The output of the analog-to-digital converter 290 is provided to a symbol information processor 104 which is dedicated to the single receiver. With reference to FIG. 4, the digital signal is processed as described above for one of the two branches, including blocks 300 and 310, under control of a microcontroller 330 as previously described. More specifically, with reference to FIG. 11, at block 400' the average signal-to-noise ratio S is calculated. The digital signal is passed through a digital filter bank (block 402'), and an accuracy indicator value P$_{fn}$ assigned for each combination of symbols in a window of interest. An estimated symbol k is selected based on the matched filter having the highest output (block 406'). The estimated symbols are accumulated for an entire packet, including CRC and FEC segments (block 408'). The entire packet is passed for error decoding and correction (block 410'), the estimated data symbols are output as a hard packet (PAK) and the error flag is set (EC or $\overline{EC}$) to indicate whether or not the packet has passed error decoding. In addition, the matched filter outputs from block 402' are supplied to the soft decision logic (block 422') for a determination of the P$_{soft}$ accuracy indicator. The P$_{soft}$ value can be determined based on the highest matched filter output, or the weighted correlation value or the associated probability of error value, as described above.

Figure 12:
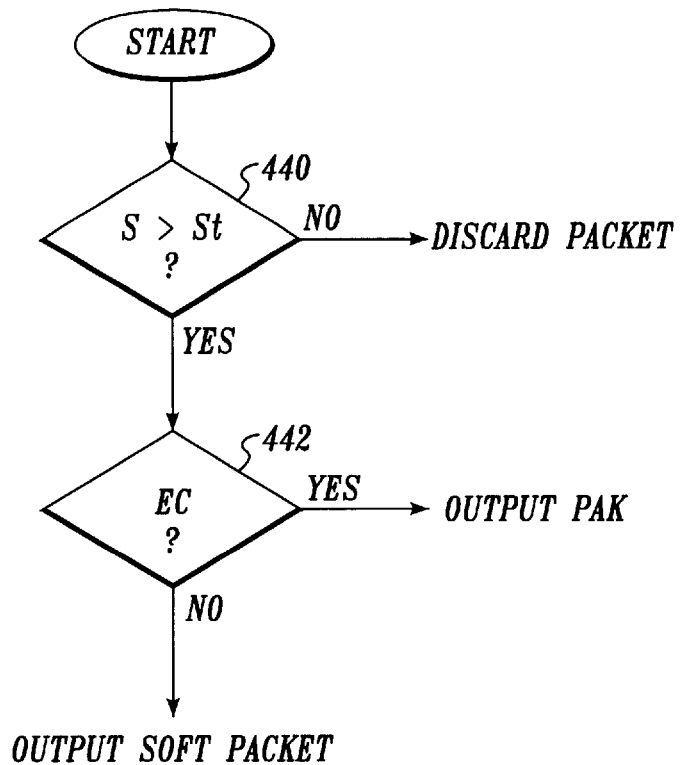
FIG. 12 is a flow diagram illustrating the logic employed by a nondiversity receiver in accordance with the present invention.

With reference to FIG. 12, the nondiversity receiver logic begins with an evaluation as to whether the signal-to-noise ratio S is greater than the threshold St (block 440). If not, no information is sent to the central controller ("discard packet"). If the signal-to-noise ratio is greater then the threshold, the logic proceeds to block 442, for a determination as to whether or not the packet has passed error decoding. If so, the hard packet PAK is sent to the central controller. Otherwise, the soft decision calculations are performed, and a soft packet (PAK$_{unc}$) sent to the controller consisting of each symbol k and associated accuracy indicator P$_{soft}$.

Central Controller Processing

For each pager response signal, the central controller receives packets from receivers which detected the response signal, decoded the response signal and forwarded a packet as described above. Packets from microdiversity receivers are not distinguished from packets from nondiversity receivers. Hard packets will contain estimated symbols, whereas each soft packet will contain both a series of estimated symbols and associated accuracy indicator (P$_{soft}$) values, preferably in the form of probability of error values as described above with reference to "Conditional Probability of Symbol Error." All packets sent to the central controller include CRC and FEC parity bits. Preferably each packet also identifies the receiver sending it.

Figure 13:
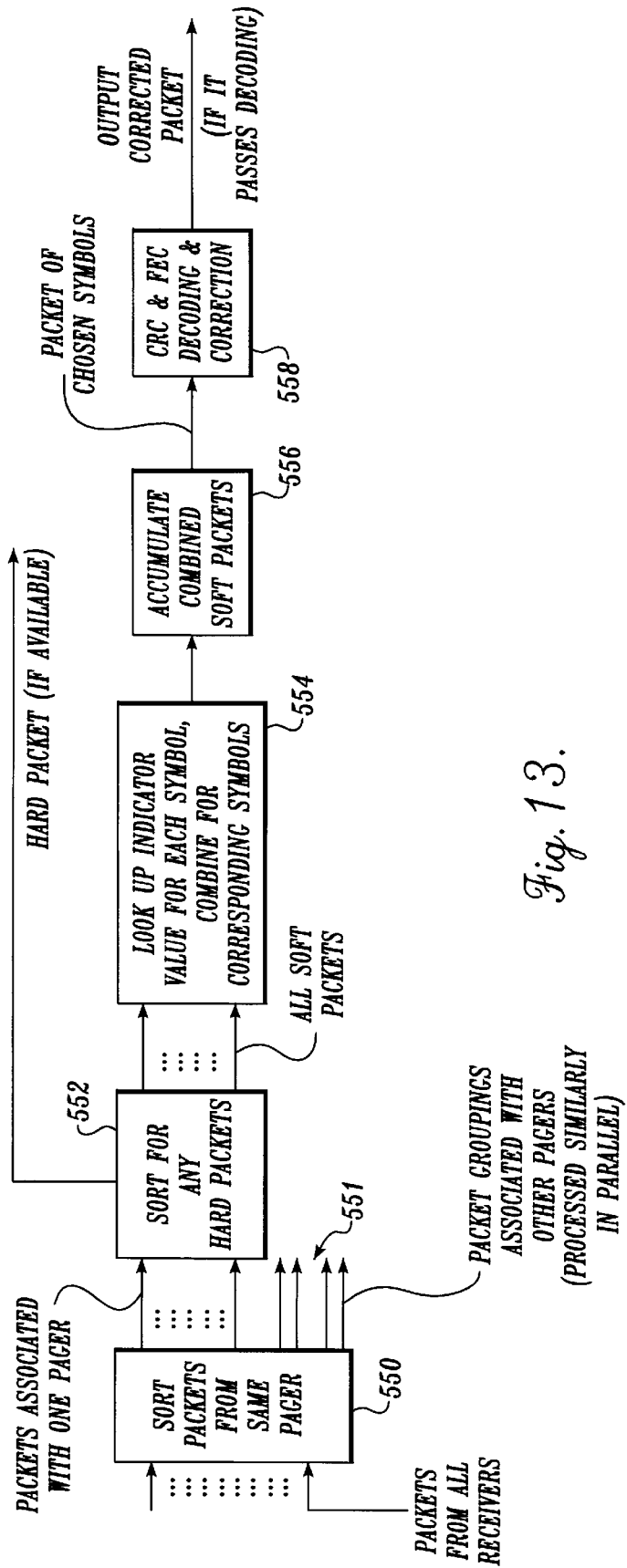
FIG. 13 is a block diagram illustrating processing signal packets from microdiversity and nondiversity receivers at a central controller in accordance with the present invention.

FIG. 13 shows the sequence followed by a first embodiment of central controller. As represented by block 550, after a page has been sent, the central controller monitors the time slots for pager responses to determine whether any responses have been received, and data continues to be checked until all packets from the time slot of interest are available for evaluation and processing. The packets are sorted by pager, as represented at 551. Next, the packets for the pager of interest are evaluated to determine whether any were hard packets (block 552). The central controller can accept the first hard packet as conveying the correct response symbol data from the pager, without other processing being required.

In the preferred embodiment, it is only if no receiver has output a decodable hard packet that additional processing is required at the central controller. This is important because processing can be extensive and time-consuming, particularly during periods of signal congestion when several activities are demanded of the central controller. Nevertheless, in the absence of any hard packets, and in the presence of one or more soft packets, the central controller processes the soft packets. At block 554, the central controller uses a copy of the look-up table to convert the conditional probability of error value back to the accuracy indicator value (i.e., the value actually output by the matched filter in the receiver). The advantage of using the intermediate steps of converting the indicator to a conditional probability of symbol error at the receiver, and converting the conditional probability of symbol error back to the accuracy indicator at the central controller is that it allows receivers of different manufacturers to be used. Alternatively, the central controller can base its determination of the most likely response signal sent by the pager on the conditional probability of symbol error value, such as if the central controller has not been programmed with the look-up table for each receiver.

In general, the soft packets are then combined (block 554) as described above with reference to a microdiversity receiver, with the exception that the combining may include more than two soft packets. As occurs in a microdiversity receiver, at the central controller the combined packets include the CRC and FEC parity bits in addition to the data symbols and associated accuracy indicator values. The combining is performed on a symbol-by-symbol basis, and the information accumulated for the entire packet (block 556). The combined packet is error checked (block 558) which includes error correction. If the combined packet passes error decoding, the estimated symbol is output as a hard packet. Otherwise, the central controller reacts as though no packets were received.

Central Controller Combining Algorithm for Soft Packets (No Hard Packets Present)

With respect to the combining algorithm for soft packets, throughout this section, the number of receiver sites (microdiversity and nondiversity), referred to as the "order" of diversity, is denoted L. To illustrate, assume there are four possible symbols, (−3, −1, 1, 3), transmitted by a personal paging unit, corresponding to four response signals. The symbol combining routine will therefore use $(k^1, P_{soft}^1), \ldots, (k^L, P_{soft}^L)$ as input variables and produce $c_n$ as the estimated (combined) symbol.

One combining method, referred to as selection combining, takes the combined symbol $c_n$ to be the candidate symbol that has the highest soft symbol information (i.e., highest accuracy indicator). Selection combining is described by the equation:

$$(\max_{1 \leq k \leq L} \{P_{soft}^k\} = P_{soft}^p) \Rightarrow (c_n = k^p) \tag{7}$$

The preferred embodiment of the current invention includes the equal gain combining method. To implement equal gain combining, the coefficients defined in the following equation must be computed first:

$$\mu_k = \sum_{p=1}^{L} P_{soft}^p \delta[k, k^p] \tag{8}$$

where k is one of the possible symbols −3, −1, 1, 3, and $\delta[m, n]$ is the Kronecker symbol:

$$\delta[m, n] = \begin{cases} 1, m = n \\ 0, m \neq n \end{cases}$$

The data processor estimates the output symbol according to the following equation:

$$\max_{m=-3,1,3} \{\mu_m\} = \mu_k \Rightarrow c_n = k \tag{9}$$

As can be seen by the above equations, each possible symbol has zero or more indicators that have been calculated and output by one of the symbol information processors. Where a possible symbol has an indicator output by a symbol information processor, the symbol information processor has selected that particular symbol to be the candidate symbol. The indicators for each possible symbol are added, producing $\mu_k$ for each symbol. The symbol associated with the $\mu_k$ of maximum value is determined to be the estimated symbol, $c_n$, transmitted by the pager.

To illustrate the combining methods, let L=3 be the number of receivers and w=1 be the correlator window length for a base receiver. Consider that the soft symbol information received by the base station is additive, i.e., it is either the maximum sample of the matched filter output, or the weighted correlation indicator defined in equation (4). The first receiver demodulates a received signal and calculates an indicator value to produce the symbol, indicator pair (1, 7.88). The second receiver produces the symbol, indicator pair (1, 4.25). The third receiver produces the indicator pair (3, 9.75). At time t=nT the base station receives the following information from the base receivers:

$(k^1, P_{soft}^1) = (1, 7.88)$ $(k^2, P_{soft}^2) = (1, 4.25)$ $(k^3, P_{soft}^3) = (3, 9.75)$ Using the method of selection combining, as defined by equation (7), since $$\max_{m=1,2,3} \{P_{soft}^m\} = P_{soft}^3$$

the selection combiner will output the symbol:

$c_n = 3$

Using equal gain combining, as defined by equations (8) and (9), the data processor performing the combination calculates the following values of $\mu_k$:

$\mu_{-3} = 0, \mu_{-1} = 0, \mu_1 = 12.13, \mu_3 = 9.75$

Since $$\max_{m=-3,-1,1,3}\{\mu_m\}=\mu_1$$

The equal gain combiner will output the symbol, resulting in:

$$c_n=1$$

Prioritizing Data

In addition, a manner of reducing the amount of processing required at the central controller is to prioritize packets based on a number of selection criteria. Processing of the response signals from receivers can be extensive, particularly if many soft packets are received, and processing power of the central controller can be conserved if it first directs its attention to the most probable sources of useful received packets.

The estimation of the reliability of a particular receiver or set of receivers can be based on additional information sent out to the central controller from the receivers together with their soft or hard packet information. This information includes an indication of pass or fail for both the CRC and the FEC decoding at the receiver as well as an indication of the number of errors corrected in a hard packet. It also includes an indication of signal-to-noise ratio.

Figure 14:
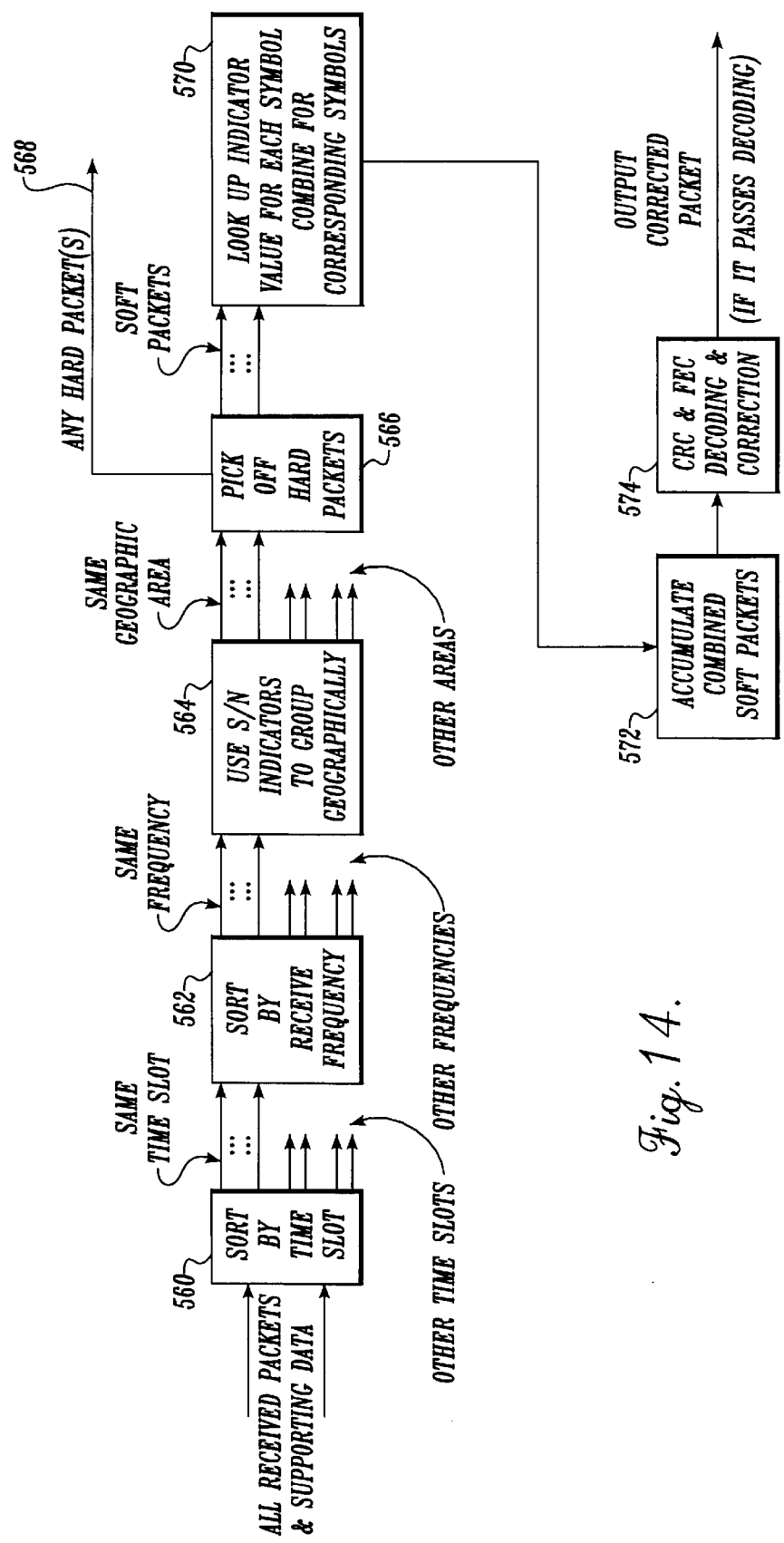
FIG. 14 is a block diagram illustrating an alternative method of processing signal packets from microdiversity and nondiversity receivers at a central controller in accordance with the present invention.

In the embodiment illustrated by the flow diagram of FIG. 14, the central controller receives many packets from the receivers. These may be hard or soft and contain the additional information noted above.

The packets are sorted by time slot at block 560. All packets which were received in particular time slots are grouped for further processing. The packets from a particular time slot are then grouped according to the frequency that they were received on at block 562. The packets which were received on the same frequency are grouped for further processing.

At block 564 the signal-to-noise ratio indications are then examined. The highest signal-to-noise indications are used as the centers for grouping of receiver signals.

In a controlled system where pager transmissions are regulated it can be assumed that a particular pager response will be received by a cluster of receivers which are close to each other. It is probable that one or more receivers will give hard packets and then others close by will give soft packets. Others outside the immediate area but perhaps in a favorable reception location such as a hill top may also give good signals, including hard packets. It is unlikely that receivers very distant from the main cluster will receive the same pager response.

The packet grouping process can therefore use good signal-to-noise indications to determine the centers of possible groups. If any hard packets are received then they can be selected at 566 and output at 568.

The soft packets which were in the group may be disregarded if they are similar to the hard packet(s) received in order to save processing time.

If no hard packet is available or the soft packets do not correlate to them then the soft packets may be combined at 570, 572 and 574 as described above with reference to FIG. 13.

Additional Features

Normalization of REC1 and REC2 signals

In order to properly combine, process and compare signals detected at the different antennas of a microdiversity receiver, ideally the gain of the RF front end for both antenna inputs would be the same. However, component tolerance variability, and normal wear and tear, can result in differing gain through the receiver front ends (i.e., upstream of the symbol information processors).

Figure 15:
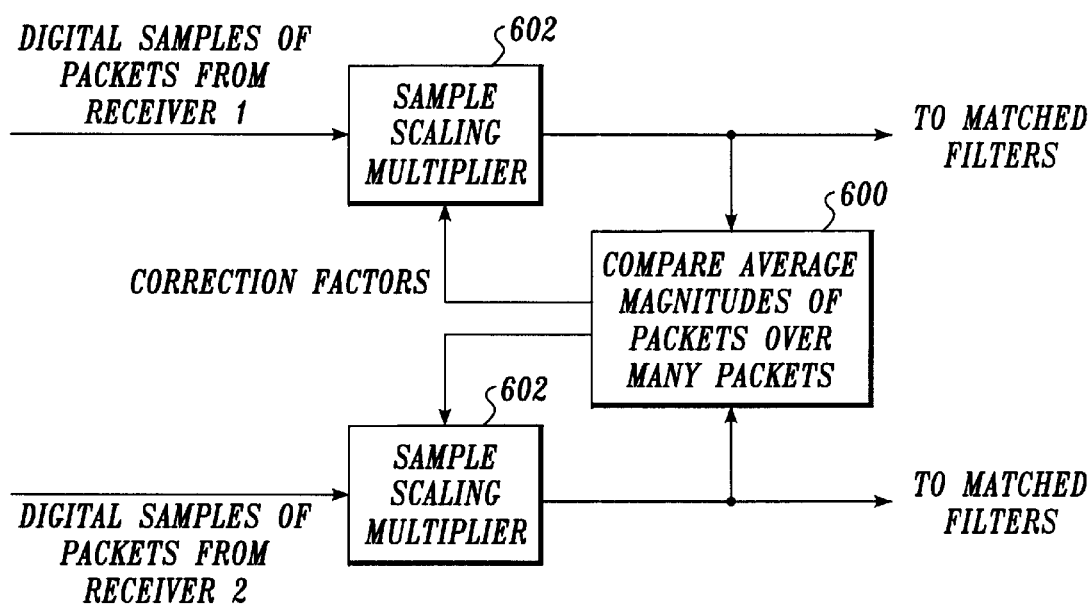
FIG. 15 is a block diagram illustrating normalization of signals as can be performed in a microdiversity receiver in accordance with the present invention.
Figure 16:
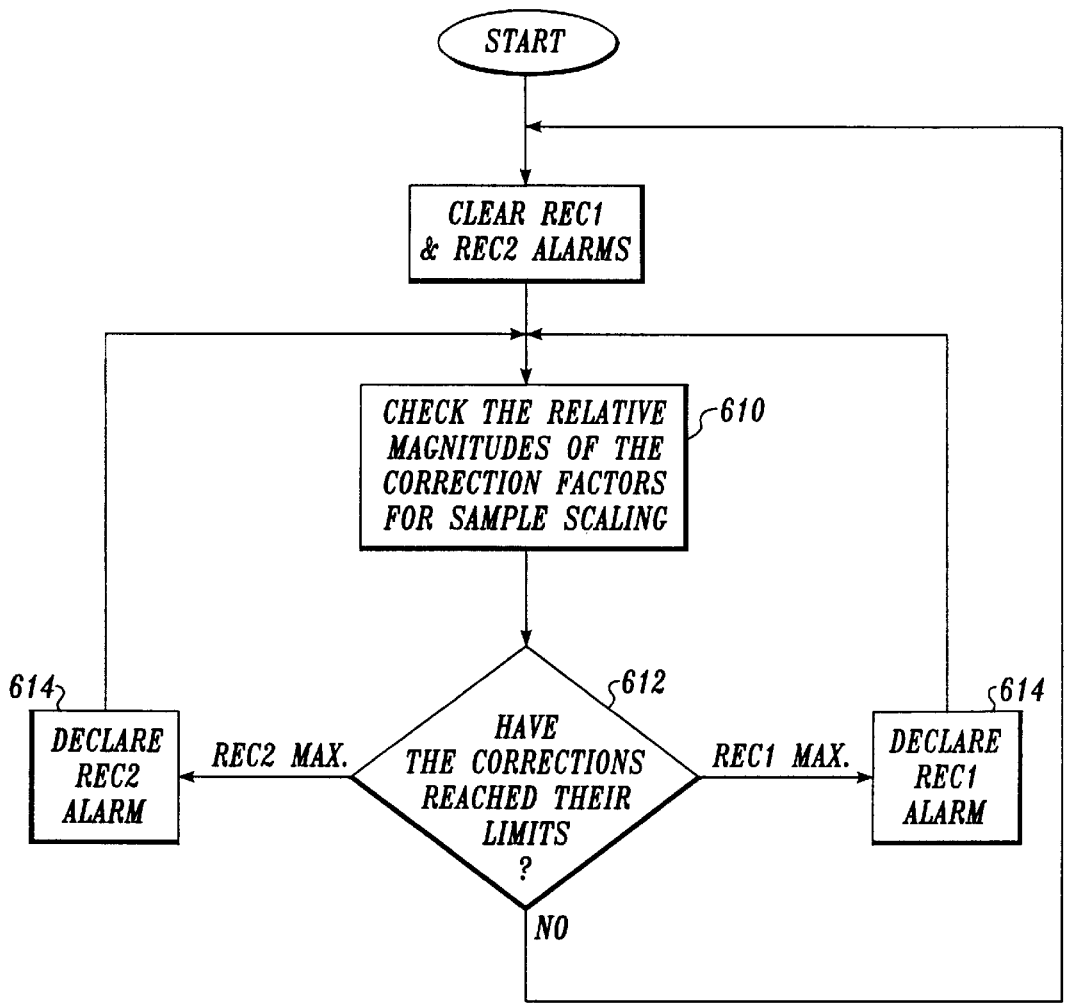
FIG. 16 is a flow diagram illustrating automatic gain mismatch detection between two channels of a microdiversity receiver in accordance with the present invention.

As represented in FIG. 15, the digital signal processing can compensate for any gain mismatch in the receivers. This is done at the demodulated baseband level, just before blocks 400 and 402 of FIG. 5A. Because of the reasonably close proximity of the separate antennas, the average signal magnitudes over many packets should be approximately equal. As represented by block 600 of FIG. 16, the average magnitudes from the separate receiver components are compared over many packets, such as $2^{18}$ symbols, and a "correction factor" calculated so that one or the other of the digital signals is scaled accordingly (blocks 602), thereby adjusting for gain mismatch at the front end.

Automatic gain mismatch detection between the two diversity channels

The average difference in received signal strength for the separate receiver components of a microdiversity receiver can be monitored and tracked as a diagnostic tool. If the levels change relative to each other over a long period of time, this can be used as an indication of failure or predicted failure of one of the receiver components. The measurement needs to be averaged over a long period of time and with signals from multiple pagers because there will normally be variations in the signal strengths between the two receiver components. Statistics on the signal strength of received packets are calculated and the mean signal strength of the two channels compared. A decision of "mismatch" is determined when the difference exceeds a threshold. For example, with reference to FIG. 16, the scaling factors determined above with respect to "Normalization of REC1 and REC2 Signals" can be compared and averaged over a predetermined period (block 610), and a decision reached as to whether the scaling factors have exceeded a threshold (block 612), when averaged over the predetermined period. If so, an alarm condition can be declared (blocks 614).

Alarm on received packets

Figure 17:
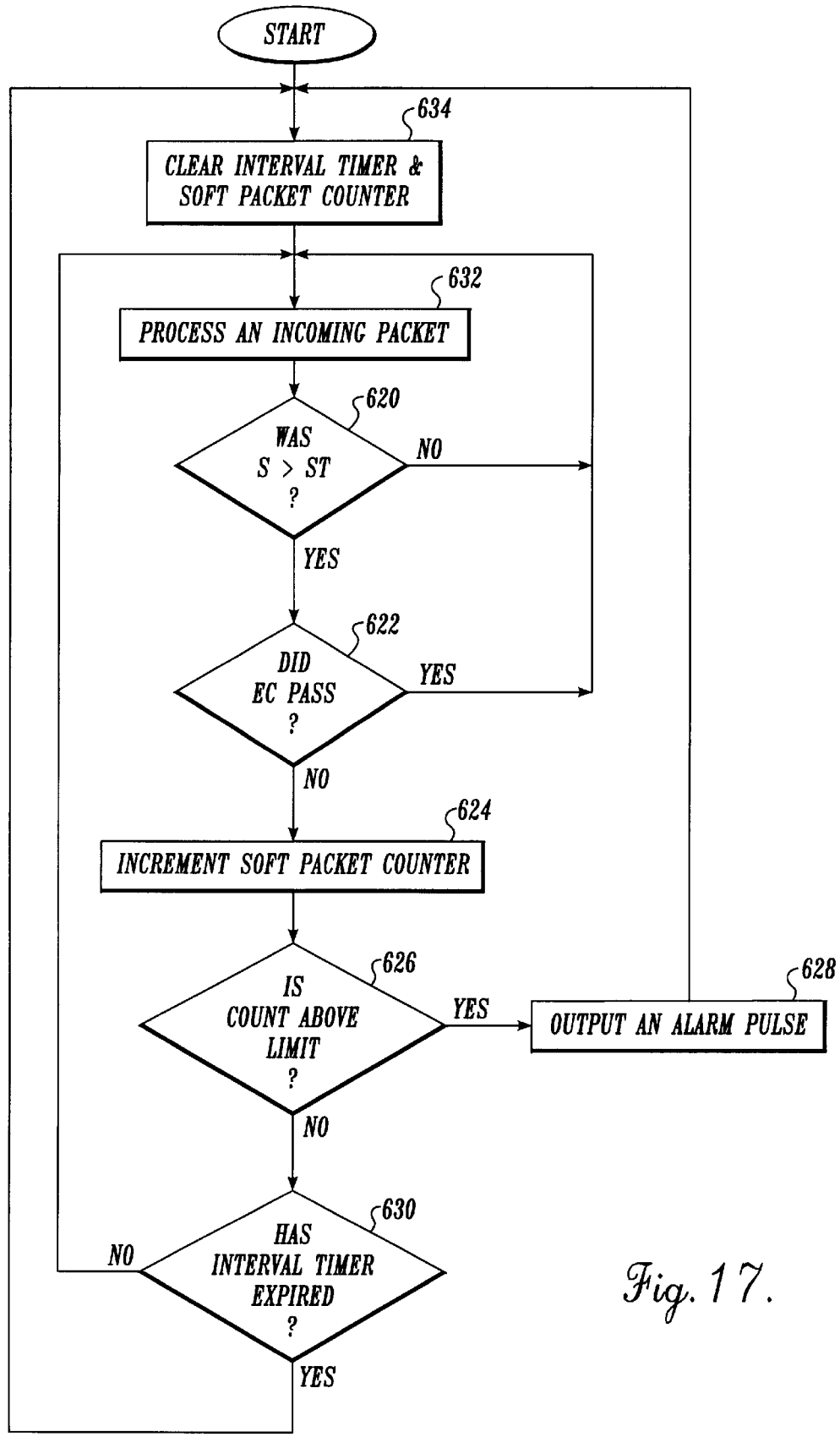
FIG. 17 is a flow diagram illustrating one aspect of a self diagnostic system for a receiver in accordance with the present invention.

As another diagnostic tool, it is worthwhile to monitor the performance of a receiver component (microdiversity or nondiversity) for conditions which indicate signal distortion or interference problems. One such indication would occur if the receiver component consistently detects strong signals, but rarely if ever outputs a hard packet. For example, referring to FIG. 17, the self-diagnostic system of a receiver component can determine if signal-to-noise ratio exceeds the threshold (box 620). If this condition is present consistently, the signal should pass error decoding and the receiver should be outputting hard packets. If error decoding is not successful (block 622), a "soft packet counter" is incremented (block 624). This indicates the number of times that a strong signal was received without error decoding being successful. At block 626 an evaluation is made as to whether or not the count is above a predetermined limit. If the count is exceeded, an alarm condition can be transmitted (block 628) so that corrective action can be taken for that receiver component. Otherwise, at block 630 a determination is made as to whether or not a predetermined time interval has passed (block 630). If not, the self-diagnostic procedure continues by processing the next packet (block 632). However, if the predetermined interval has elapsed, the interval timer and soft packet counter are reset (block 634). Consequently, the alarm condition is transmitted only if a predetermined number of soft packets have been produced, despite strong signals having been received, within a predetermined interval.

Site noise measurement

Normally specialized test equipment is required in order to accurately evaluate noise present at a receiver site. In accordance with the present invention, site noise measurement is possible within one or more of the receiver components. First, the receiver component is calibrated for self noise at the time of manufacture. The inherent noise generated by the receiver component itself is known. Then, at the time of installation at the site, the antenna gain and antenna cable loss is measured, and entered into the receiver microprocessor (component 330 of FIG. 4). Also known is the thermal background noise level (−174 dBm/Hz). This information is used to provide an indication of the receiver coverage area degradation, compared to ideal.

Figure 18:
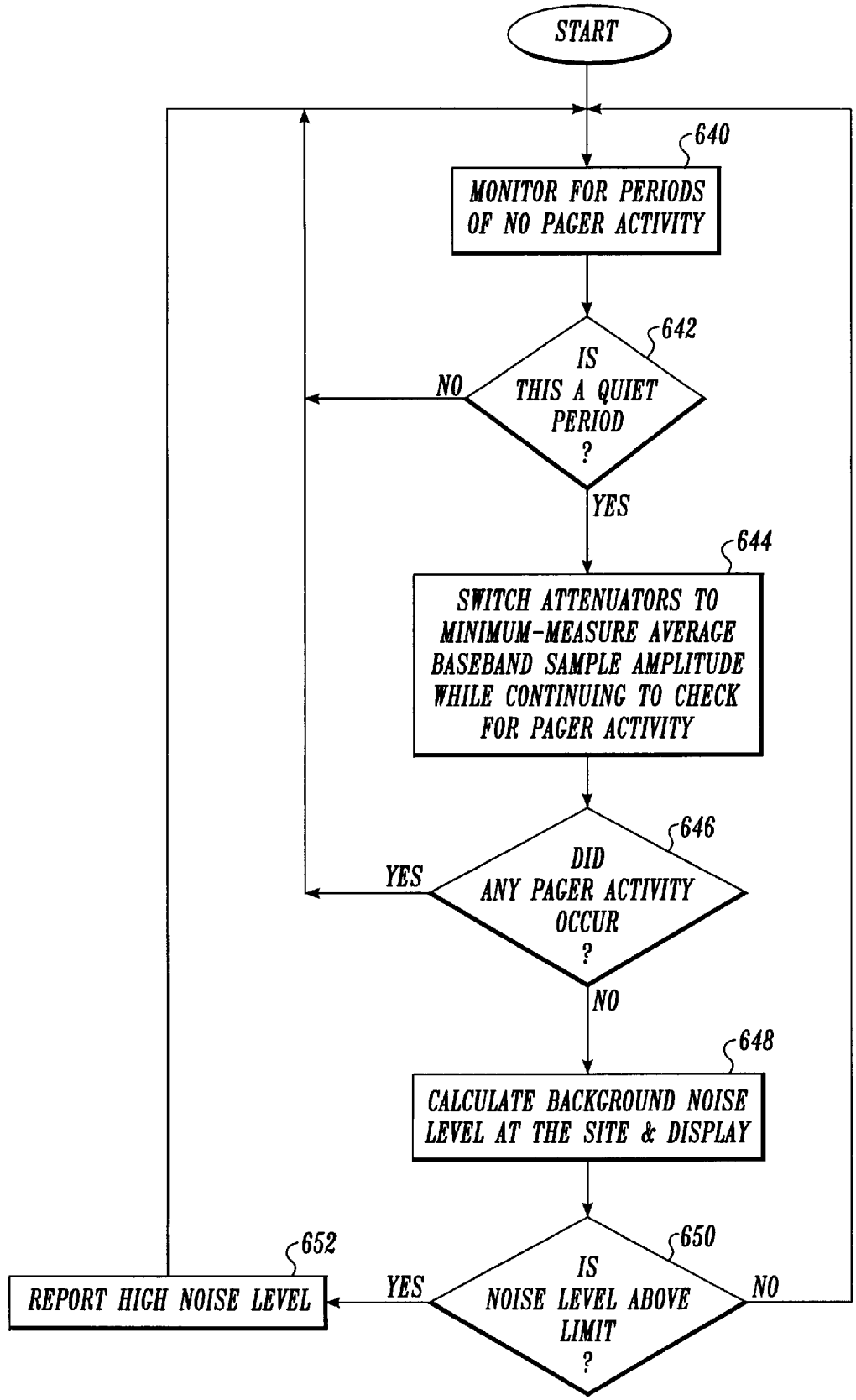
FIG. 18 is a flow diagram illustrating site noise measurement conducted by a receiver in accordance with the present invention.

With reference to FIG. 18, the receiver monitors for periods of no pager activity (block 640). When a "quiet period" (no pager activity) is detected (block 642), the attenuators of the receiver component (260 of FIG. 2) are set to minimum, and the baseband sample amplitude ($I^2+Q^2$) is measured (block 644). The receiver continues to check for pager activity (boxes 642 and 646) and suspends the background site noise calculation if such pager activity occurs. Provided the quiet period continues, the background noise level at the site is calculated (block 648).

Denoting I and Q as the in-phase and quadrature components, the site background $N_B$ (dBm/Hz) noise is given by:

$$N_B = 10\log\left(\sum_{i=1}^{n}(I_i^2+Q_i^2)\frac{1000}{nR_{ref}} - Rx_{noise}\right) - 10\log(BW) - G_{misc} \quad (10)$$

where BW is the receiver noise bandwidth, $G_{misc}$ is the miscellaneous gain, the 1000 factor is for conversion to dBm and $R_{ref}$=50 ohms. $G_{misc}$ is $$G_{misc}=\text{ReceiverGain}-\text{CableLoss}+\text{AntennaGain} \quad (11)$$

and $Rx_{noise}$ is the equivalent noise of the receiver, as given by $$Rx_{noise} = 10^a \quad (12)$$

$$a = \frac{-174 + NF + 10\log(BW) + \text{ReceiverGain}}{10}$$

where −174 dBm/Hz is the background thermal noise, and NF is the noise figure of receiver.

If the background noise level is above a predetermined limit (box 650), a report or alarm condition (block 652) is transmitted by the receiver, to alert the paging system provider that the coverage area for the receiver is less than design criteria.

While preferred embodiments of the present invention have been illustrated and described, it will be appreciated that various changes can be made therein without departing from the spirit and scope of the invention.

The embodiments of the invention in which an exclusive property or privilege is claimed are defined as follows:

1. A receiver for processing radio frequency signals of different signal strengths, which signals are broadcast at a transmission frequency from a plurality of sources dispersed in a geographic area, such radio frequency signals being modulated to contain a series of digital symbols, said receiver comprising:

(1) a first antenna for detecting the radio frequency signals;

(2) a second antenna for detecting the radio frequency signals and separated from the first antenna for decreased correlation of the radio frequency signals as detected at the two antennas;

(3) a first receiver component coupled to the first antenna for demodulating the signals as detected by the first antenna;

(4) a second receiver component coupled to the second antenna for demodulating the signals as detected by the second antenna, each of the first and second receiver components including:

(a) means for converting the detected signals to digital form; and (b) means for processing the signals in digital form to detect the digital symbols, the processing means including means for analyzing all possible combinations of symbols over a predetermined time period and for assigning an accuracy indicator to each of such combinations corresponding to the probability that such combination has been accurately detected, said processing being conducted independently for each detected symbol on a symbol-by-symbol basis without reference to the results of preceding processing to detect the symbols or estimates of subsequent processing or detection; and (5) means for combining the accuracy indicators of corresponding symbols detected by the first and second receiver components, respectively, so as to determine the most likely series of detected symbols.

2. The receiver defined in claim 1, in which each of the first and second receiver components includes means for quantifying and outputting an indication of the signal-to-noise ratio of the detected signals independently of the processing means assigning the accuracy indicators.

3. A paging system comprising a plurality of receivers each as defined in claim 1, the radio frequency signals being response signals from portable pagers disbursed in the geographic area, the plurality of receivers being disbursed in the geographic area, the combining means of each receiver including means for transmitting the most likely detected symbols determined by the combining means and the corresponding combined accuracy indicators, and a central controller for receiving the most likely detected symbols and corresponding accuracy indicators transmitted by the combining means, the central controller having means for processing the most likely detected symbols and corresponding combined accuracy indicators from different receivers to determine the most likely response signals sent by a pager.

4. The receiver defined in claim 1, in which the radio frequency signals are response signals from portable pagers disbursed in the geographic area.

5. The paging system defined in claim 4, in which the accuracy indicators are numerical with a higher number indicating a greater probability of accurate detection of a symbol and a lower number indicating a lesser probability of accurate detection of a symbol, the central controller having means for determining the most likely response signal sent by a pager by combining the accuracy indicators for symbols received from different receivers and determining the symbols for which the combined accuracy indicators are the highest.

6. The receiver defined in claim 1, in which each of the first and second receiver components includes:

a fixed gain amplifier coupled to the respective antenna for amplifying the detected signals, whereby strong detected signals and weaker detected signals are amplified by the same gain factor;

a first bandpass filter coupled between the antenna and the fixed gain amplifier and having the transmission frequency in the passband of the first filter;

a first mixer coupled to the amplifier for downconverting the amplified signals to a first intermediate frequency less than the transmission frequency;

a second bandpass filter coupled between the amplifier and the first mixer and having the frequency of the amplified signal within the passband of the second filter;

a third bandpass filter coupled to the first mixer and having the first intermediate frequency within the bandpass of the third bandpass filter;

an adjustable attenuator coupled to the third bandpass filter for selectively attenuating the amplified and filtered signals;

a second mixer coupled to the attenuator for downconverting the attenuated signals to a second intermediate frequency much lower than the first intermediate frequency;

a fourth bandpass filter coupled to the second mixer and having the second intermediate frequency within the passband of the fourth bandpass filter;

an analog-to-digital converter coupled to the fourth bandpass filter and having a predetermined dynamic range for converting the attenuated and filtered signals to digital form; and a monitor for detecting the dynamic range of the digital signals from the analog-to-digital converter, the monitor being coupled to the attenuator for adjusting the degree of attenuation based on the predetermined dynamic range of the analog-to-digital converter without adjusting the gain of the fixed gain amplifier, whereby strong amplified signals are attenuated to a greater degree than weak amplified signals to avoid excessive clipping of the strong amplified signals by exceeding the predetermined dynamic range of the analog-to-digital converter, the radio frequency signals being modulated to include packets comprising digital symbols, and the monitor including means for controlling adjustment of the attenuation at the beginning of each packet, for holding the attenuator constant for the remainder of the duration of each packet, and for controlling the attenuator to effect minimum attenuation following each packet.

7. The receiver defined in claim 6, including a first local oscillator coupled to the first mixer of each of the first and second receiver components for controlling the first intermediate frequency.

8. The receiver defined in claim 7, including means for adjusting the first local oscillator automatically to maintain the first intermediate frequency centered in the passbands of the third filters.

9. The receiver defined in claim 6, including a second local oscillator coupled to the second mixer of each of the first and second receiver components for controlling the second intermediate frequency.

10. The receiver defined in claim 2, including a symbol information processor receiving the most likely detected symbols and associated accuracy indicators from the processing means and receiving the output of the quantifying means, the symbol information processor including means for transmitting an indication of the digital symbols detected by the receiver.

11. The receiver defined in claim 10, in which the symbol information processor includes means for assigning a probability of correctness indicator calculated as the highest sum of corresponding accuracy indicators divided by the mean of all other corresponding summed accuracy indicators.

* * * * *

UNITED STATES PATENT AND TRADEMARK OFFICE
CERTIFICATE OF CORRECTION

PATENT NO. : 5,809,090
DATED : September 15, 1998
INVENTOR(S) : B.D. Buternowsky et al.

It is certified that error appears in the above-identified patent and that said Letters Patent is hereby corrected as shown below:

On the title page, item

[75], Inventors:   "Glaudio" should read --Claudio--
Pg. 1, col. 1   (7th Inventor)

Column 22, Line 6,   "attenuator" should read --attenuation--
(Claim 6, line 50)

Signed and Sealed this

Sixteenth Day of February, 1999

Attest:

Attesting Officer

*Acting Commissioner of Patents and Trademarks*